US011828851B2

(12) United States Patent
Bowman et al.

(10) Patent No.: US 11,828,851 B2
(45) Date of Patent: Nov. 28, 2023

(54) WIDE-FIELD RESONANT ELECTRO-OPTIC IMAGING DEVICES AND APPLICATIONS

(71) Applicant: The Board of Trustees of the Leland Stanford Junior University, Stanford, CA (US)

(72) Inventors: Adam Bowman, Stanford, CA (US); Mark A. Kasevich, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 470 days.

(21) Appl. No.: 17/153,438

(22) Filed: Jan. 20, 2021

(65) Prior Publication Data

US 2021/0223399 A1    Jul. 22, 2021

Related U.S. Application Data

(60) Provisional application No. 62/963,402, filed on Jan. 20, 2020.

(51) Int. Cl.
*G01S 17/00* (2020.01)
*G01S 17/894* (2020.01)
(Continued)

(52) U.S. Cl.
CPC .......... *G01S 17/894* (2020.01); *G01S 7/4863* (2013.01); *G01S 7/4865* (2013.01)

(58) Field of Classification Search
USPC ....................................... 356/5.01
See application file for complete search history.

(56) References Cited

U.S. PATENT DOCUMENTS 5,157,451 A    10/1992  Taboada
5,162,861 A    11/1992  Tamburino
(Continued)

FOREIGN PATENT DOCUMENTS

| EP | 3059950 | 8/2016 |
| WO | WO2020056059 | 3/2020 |
| WO | WO2020106972 | 5/2020 |

OTHER PUBLICATIONS

Jo et al., "High resolution three-dimensional flash LIDAR system using a polarization modulating Pockels cell and a micro-polarizer CCD camera", 2016, Optics Express v24n26.

*Primary Examiner* — James R Hulka
(74) *Attorney, Agent, or Firm* — LUMEN PATENT FIRM

(57) ABSTRACT

We provide a wide-field time-resolved imaging apparatus using resonant drive. We also identify ideal configurations of electro-optic (EO) modulator crystals for wide-field imaging. These techniques enable compact and low-cost LIDAR imaging devices. Resonant drive affords modulation of various EO modulators at high voltage by means of resonant voltage enhancement. Further, it enables operation of imaging modulators at high frequencies which would otherwise not be possible with conventional pulsed drivers—this leads to improved LIDAR accuracy and dynamic range. Resonant drive uniquely enables Pockels cell LIDAR beyond normal flash mode by allowing for multiple pulses or multiple cycles of amplitude modulated illumination to be present simultaneously in a scene. This corresponds to illumination and modulation waveforms having a defined phase relationship where time-of-flight is encoded in the phase of the returning light waveform.

18 Claims, 13 Drawing Sheets

(51) Int. Cl.
  *G01S 7/4865* (2020.01)
  *G01S 7/4863* (2020.01)

(56) References Cited

U.S. PATENT DOCUMENTS

| | | | |
|---|---|---|---|
| 5,189,547 | A | 2/1993 | Day |
| 8,471,895 | B2 | 6/2013 | Banks |
| 8,493,645 | B2 | 7/2013 | Yafuso |
| 10,012,532 | B2 | 7/2018 | Send |
| 11,592,393 | B2 * | 2/2023 | Bowman ............ G01N 21/6458 |
| 2007/0236771 | A1 | 10/2007 | Zadoyan |
| 2008/0029692 | A1 | 2/2008 | Yafuso |
| 2011/0073447 | A1 * | 3/2011 | Edwards ................ G01J 5/44 |
| | | | 324/457 |
| 2017/0248796 | A1 | 8/2017 | Banks |
| 2020/0059638 | A1 | 2/2020 | Banks |
| 2021/0109223 | A1 * | 4/2021 | Atalar ................ G01S 7/4915 |
| 2021/0389244 | A1 * | 12/2021 | Bowman ............... G01S 17/894 |

* cited by examiner

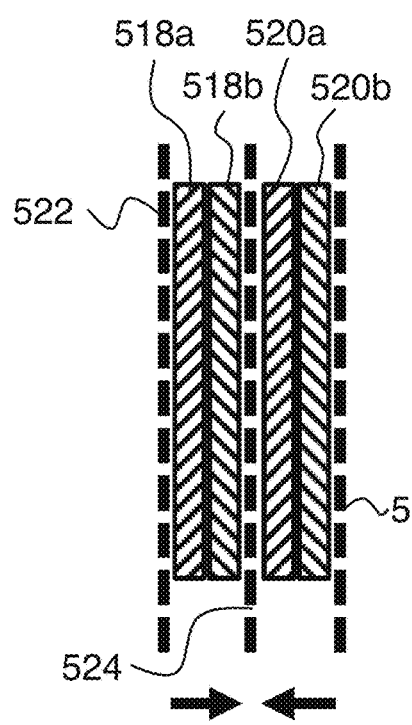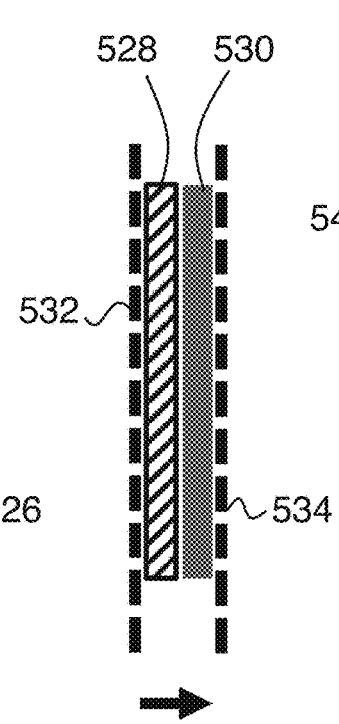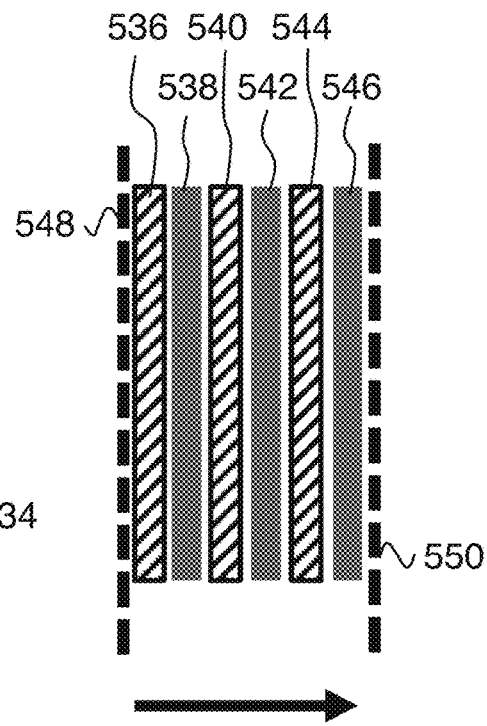
FIG. 5C  FIG. 5D  FIG. 5E
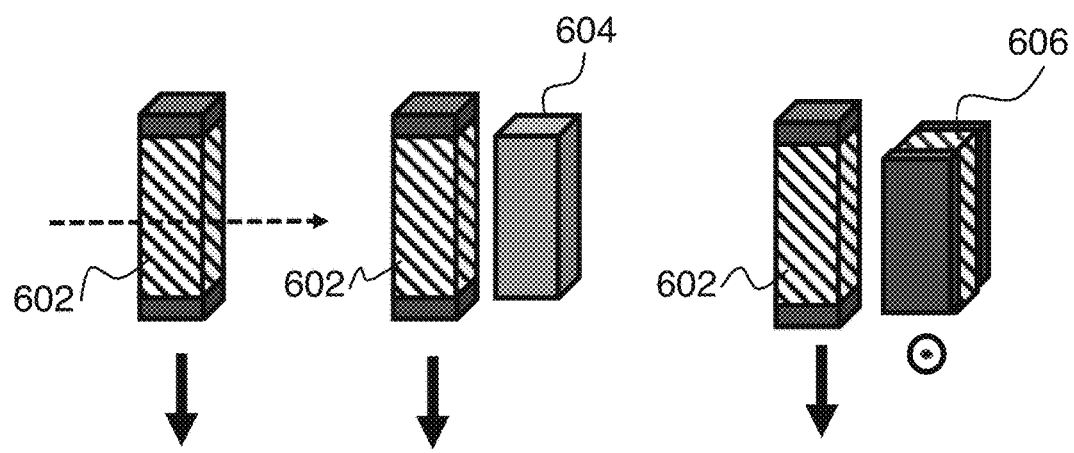
FIG. 6A  FIG. 6B  FIG. 6C

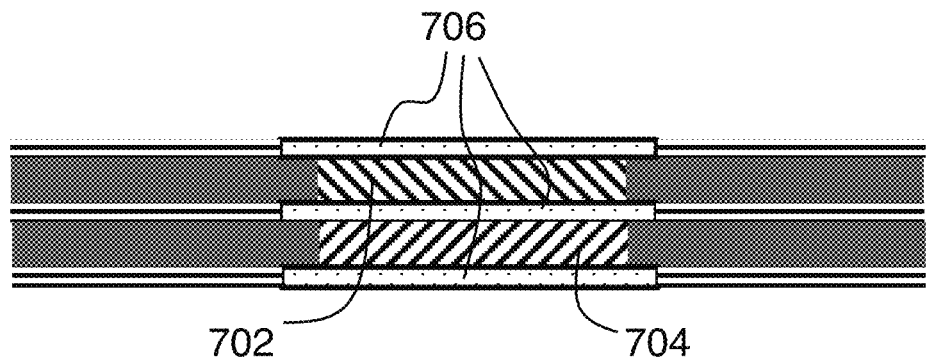
FIG. 7A
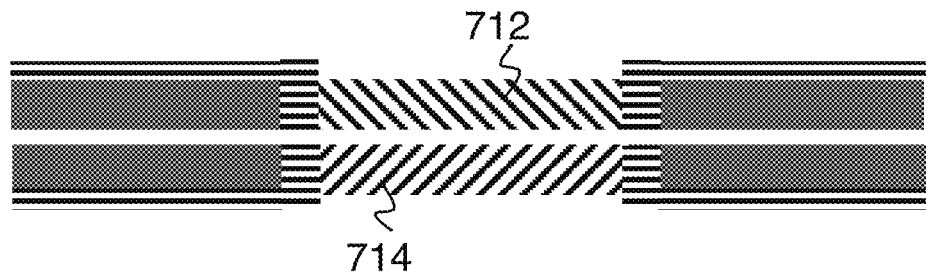
FIG. 7B
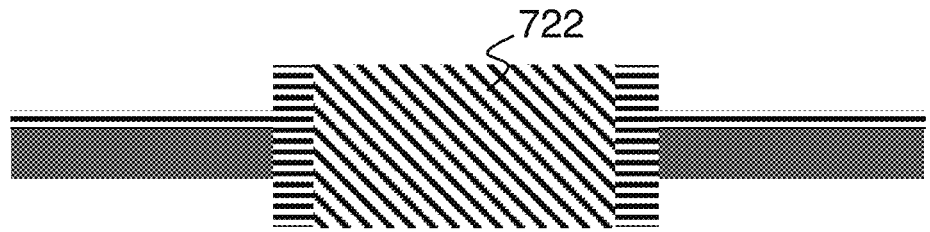
FIG. 7C
 PCB/dielectric
 Conductive, optically-admitting layer
 EO crystal
 electrical trace or conductive electrode

WIDE-FIELD RESONANT ELECTRO-OPTIC IMAGING DEVICES AND APPLICATIONS

CROSS REFERENCE TO RELATED APPLICATIONS

This application claims the benefit of U.S. Provisional Patent Application 62/963,402 filed Jan. 20, 2020, which is incorporated herein by reference.

FIELD OF THE INVENTION

This invention relates to time resolved optical imaging.

BACKGROUND

Wide-field imaging with nanosecond resolution is critical for efficient LIDAR sensors. Conventional point and array-scanning LIDAR is complex, has high component cost, and provides low throughput and low-resolution data from a scene when compared to a standard camera image. Flash lidar has emerged as a promising alternative to point scanning where a single pulse is emitted into a scene and its time of flight recorded at each pixel in a wide-field image. Detectors for flash LIDAR typically include photon-counting "click detectors" like avalanche photodiodes. Some implementations of flash LIDAR have been developed using Pockels cells (PCs) or electro-optic modulators to enable LIDAR imaging on standard CMOS camera sensors. However, PC approaches face several fundamental problems. These include challenging electronics to generate high voltage ramps, a trade-off between estimation accuracy and depth of field in an image, and low pulse repetition rates. Further, it is critical to optimize the form factor, cost, power, and photon throughput of a LIDAR sensor. However, conventional electro-optic modulators—often bulky and having limited acceptance angles for imaging—and their associated high-voltage drive electronics have prevented compact and low-cost implementations.

SUMMARY

We present a new wide-field imaging apparatus using resonant drive that address these challenges for LIDAR. We also identify ideal configurations of modulator crystals for wide-field imaging. These techniques enable compact and low-cost LIDAR imaging devices. Resonant drive affords modulation of various EO (electro optic) modulators at high voltage by means of resonant voltage enhancement. Further, it enables operation of imaging modulators at high frequencies which would otherwise not be possible with conventional pulsed drivers—this leads to improved LIDAR accuracy and dynamic range. Resonant drive uniquely enables Pockels cell LIDAR beyond normal flash mode by allowing for multiple pulses or multiple cycles of amplitude modulated illumination to be present simultaneously in a scene. This corresponds to illumination and modulation waveforms having a defined phase relationship where time-of-flight is encoded in the phase of the returning light waveform. Applications of similar technology to determining waveform shape parameters other than time delay are considered by the present inventors in international patent application PCT/US2019/062640, hereby incorporated by reference in its entirety.

Significant advantages are provided.

(1) Resonant drive permits high-voltage generation by passive electrical resonances and may be compatible with standard electronics. This allows lower power electronics (energy is recycled in the resonator) having low drive voltages and compact form-factor.

(2) Generation of high voltage gating waveforms by resonant build-up is enabled by a high electrical quality factor or Q of the resonator, this can be valuable in imaging applications where large apertures or crystals requiring high switching voltages are used.

(3) Resonant waveforms permit fast-varying gate signals to be generated over an extended period corresponding to a large depth of field (DOF) (covered by many cycles of the waveform). In conventional Pockels cell LIDAR, increasing depth of field involves sacrificing one's measurement accuracy by virtue of having a single ramped or monotonic waveform, and decreasing its slope to allow longer TOF (time of flight). Alternatively, increasing DOF would involve multiple camera exposures at different delay settings. By using a resonant waveform, we achieve high slope gating modulation over large depths of field within a single camera exposure. This amounts to improving the dynamic range of the image.

(4) Sinusoidal drive of the modulator can allow much higher repetition rates than pulsed gate waveforms, for example exceeding 1 MHz or even 100 MHz. This allows different options for illumination sources and compatibility with mode-locked lasers.

(5) By employing one drive frequency, it is possible to largely suppress the otherwise detrimental effects of piezoelectric ringing experienced when driving electro-optic crystals at high pulse repetition rates. Single frequency drive allows high system stability and also is compatible with standard RF generation and control techniques, including feedback for maintaining a stable phase.

(6) In contrast to conventional flash lidar, multiple cycles of amplitude modulated illumination may be present within the imaged scene. This allows for a periodic waveform of defined phase relation to the modulator gate where time-of-flight may be encoded in the phase of the returning light. This also allows extremely high photon throughput for increased estimation accuracy and range.

BRIEF DESCRIPTION OF THE DRAWINGS

FIGS. 5A-E show several different longitudinal modulator configurations.

FIGS. 6A-C show several different transverse modulator configurations.

FIGS. 7A-C show several different integrated modulator configurations.

DETAILED DESCRIPTION

Figure 1A:
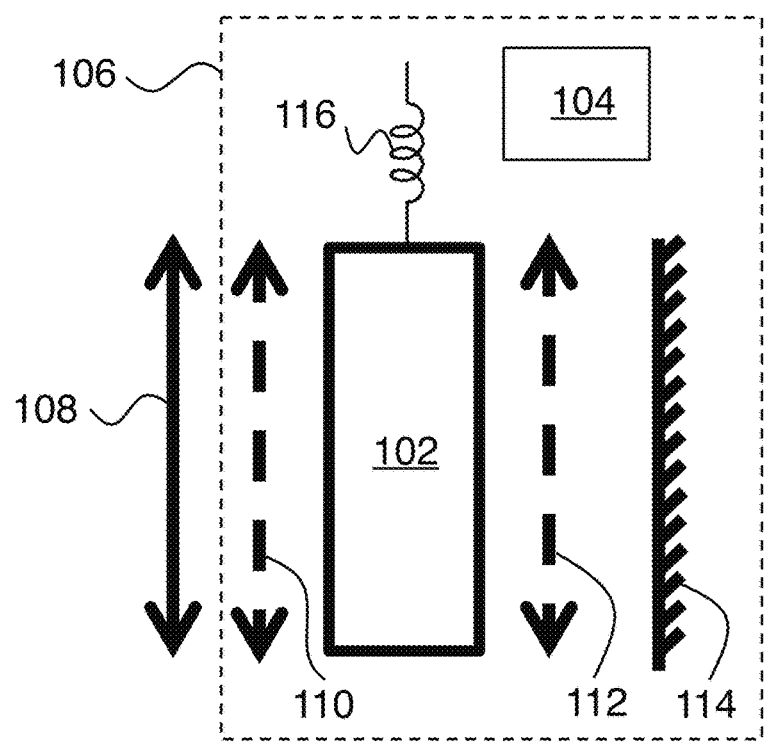
FIGS. 1A-B show exemplary embodiments of the invention.

Section A describes general principles relating to embodiments of the invention. Section B describes several exemplary embodiments of the invention.

A) General Principles

A1) Electro-Optic Modulation

We use the linear electro-optic or Pockels effect to apply polarization modulation in an imaging beam. Polarizing elements located before and after the modulator convert time dependent birefringent phase shift to image intensity captured on standard camera sensors. The intensity in one or more images thus captured allows for temporal parameters to be estimated for every pixel in parallel. The Pockels effect results in a phase shift (retardance), $\delta=2\pi\Delta_n l/\lambda$, between polarization components of light propagating through a crystal of length l and birefringence $\Delta_n$. The birefringence is linear in the applied electric field, and for a linearly polarized input results in output transmissions $T_G \sin^2(\delta/2)$ (gated channel—crossed polarizers) or $T_U=\cos^2(\delta/2)$ (ungated channel—or parallel polarizers) depending on if crossed or parallel polarizers are used. In the simplest example, a Heaviside step gating function applied to the Pockels cell acts as a shutter that can be activated on nanosecond timescales. However, many different modulation waveforms prove useful, including time-gating pulses, linear ramps, and sinusoids. These may be applied both in the estimation of temporal image parameters or in the spatio-temporal control of light.

Electro-optic imaging has several advantages compared to other fast imaging technologies. Foremost it allows simultaneous measurement of megapixel images without point scanning, enabling extremely high data-content and fast acquisition speeds. It is compatible with standard low-noise and low-cost CMOS cameras, has no intrinsic photon loss, allows high photon throughput, and is implemented all-optically. It is therefore readily integrated with existing imaging systems and strategies. Various measurement scenarios are possible. Of particular interest here is flash LIDAR where a laser pulse is emitted into a scene, and returning light is modulated with the Pockels cell such that time-of-flight information is converted into static intensity values in one or more wide-field images. Further applications include fast image gating to capture single-shot events and the determination of exponential decays (e.g. fluorescence lifetime) or other shape parameters of a returning waveform.

For applications having repetitive waveforms, the time delay or phase of the modulation waveform may be changed between camera exposures. This sort of multi-exposure acquisition method is used to extract more information from complex shapes like multi-exponential decays, or to extend range in LIDAR measurements by combining multiple images. The extraction of information from an electro-optic modulated image involves choosing appropriate estimators and understanding their fundamental limitations due to noise sources like photon shot noise.

A2) Estimating Temporal Image Parameters

Electro-optic imaging may be used to estimate temporal image parameters from a single camera exposure with time-varying scene intensity. The Pockels cell applies a normalized gating function g(t), which is equal to 0 if no polarization rotation is applied (no light passed through crossed polarizers) or equal to 1 if perfect 90 degree rotation is achieved (all light passed through crossed polarizers). The intensity at each pixel in the gated and ungated images is then determined from the convolution of the gating function with the image intensity I(t,θ) as G(td,θ)=I(t,θ)*g(t−td) and U(td, θ)=I(t, θ)*[1−g(t−td)] where θ (generally a vector) are temporal image parameters and td is a time delay or corresponding phase shift. (*) denotes convolution.

In the case where there is a single unknown parameter θ, we may for example use the ratio R(td,θ)=G/U as an estimator. Estimation accuracy for this single unknown parameter may then be calculated directly from error propagation of shot noise in the intensity bins as $$\sigma_\theta = \left|\frac{\partial \theta}{\partial R}\right| R \sqrt{\frac{1}{G} + \frac{1}{U}} \tag{1}$$

This uncertainty may be evaluated numerically using known experimental conditions, e.g. a measured gating function, or analytically for ideal cases. Other terms like dark current, read noise, or background may also be included. For example, in fluorescence lifetime imaging, each pixel has an exponential decay of intensity $I \propto e^{-t/\tau}$ and we want to estimate τ. An ideal time-gated waveform having a Heaviside step allows estimation of lifetime from the two output bins, giving τ=td/ln(1+1/R) and $$\sigma_\tau = \frac{\tau^2}{t_d \sqrt{N}} \sqrt{e^{t_d/\tau} - 1}$$

from Eqn. 1, where N is the number of detected photons. This is the Cramér-Rao bound for two time bins and approaches the shot noise limit for lifetime estimation. If τ is instead known a priori, then the excitation time $t_0$ relative to the gate may be similarly estimated as $t_0=\tau \ln(1+1/R)$ with accuracy $$\frac{\tau}{\sqrt{N}}\sqrt{e^{t_0/\tau}-1}.$$

This may be used for timing particle hits on a phosphor screen for example.

The main case of interest for this work is estimation of the time of a reflected pulse or the phase of a reflected waveform of light in flash LIDAR. In the known methods for single-pulse flash lidar, a monotonic modulation waveform may be used to map each returning time of a single pulse to an intensity value or ratio. For a linear ramp in voltage on the PC, the time of a short burst may be estimated as $t=(2t_r/\pi) \tan^{-1}\sqrt{R}$ with $$\sigma_t = \frac{t_r}{\pi\sqrt{N}},$$

where $t_r$ is the ramp time to $V_\pi$ and the camera is exposed for the duration of the ramp. For LIDAR, the number of returning photons N scales with $1/r^4$ and also depends on the reflectivity of an object in the scene.

More generally, other estimators may be used where above we have only used the gated to ungated ratio to illustrate parameter estimation. Other possibilities are G/(G+U), U/(G+U), or (G−U)/(G+U) for example. Depending on the particular optical arrangement some of these may be preferred. For example, when a single modulator is used between two polarizers such that only one polarization is detected on the camera, it is not possible to simultaneously measure G and U. Instead normalization must be performed to a different modulation delay or phase (for example one that provides total intensity G+U) (FIGS. 9A-D).

In certain cases, it is necessary to estimate multiple temporal parameters which may be coupled. One example is the components of a multi-exponential fluorescence decay. Another example might be where the LIDAR scene leads to an altered pulse shape (for example multi-path or multi-pulse interference). In this case, a more general analysis of temporal parameters may be carried out, for example, by using maximum likelihood estimation of θ. Image intensities may be described by a Poisson likelihood function corresponding to the modulation(s) and Cramér-Rao bounds may also be determined for estimation of the temporal parameters from the Fisher information matrix. Complex measurements combining multiple different time delays, phases, or modulation waveforms may be approached and optimized with this formalism.

A3) High Throughput and Precision 3D Metrology

A much higher photon throughput from the scene may be possible by operating at high repetition rates with resonant modulation (MHz). In some applications human eye-safety limits cap the number of photons which can be effectively used. For other industry applications like high precision 3D scanning, high throughput may be especially valuable. Increased photon numbers allow for improved estimation accuracies since the distance measurement is fundamentally shot-noise limited with $\sqrt{N}$ scaling of accuracy.

New camera sensors having high full-well-capacity (>1 million electrons/pixel at 100's of frames per second) will allow extremely high accuracy for 3D imaging and metrology. To motivate, an 80 MHz illumination from a high-power laser (e.g. mode-locked fiber laser) and 80 MHz optical modulation allows for a per-pixel accuracy of $\sigma_t \sim 2/\sqrt{N}$ nanoseconds. At one million electrons per pixel this gives 2 picosecond temporal resolution or distance resolution of ~300 microns over a depth of field corresponding to a single edge of the modulation of ~2 feet—just by using a single half-cycle of the modulation. Next we discuss techniques for improving the depth of field while retaining high distance resolution.

A4) Dual Modulator Technique—Increasing Dynamic Range

As discussed above, the accuracy of an electro-optic lidar imaging measurement depends on the slope of the gating waveform. In conventional flash Pockels cell LIDAR (pulse+ramp), an isolated pulse is used along with the ramping waveform at a low repetition rate (<100 kHz). This leads to a fundamental trade-off between ramp extent (depth of field—DOF) and distance resolution (from ramp slope). The ratio of (DOF/resolution) gives the dynamic range of the LIDAR image. In our methods, the modulation is periodic on the timescales of the light time-of-flight within the scene (typically >1 MHz). Further, the illumination may be a waveform or pulse-train having a defined phase relation to the modulation.

While this fast, periodic approach has many advantages in allowing new types of illumination and higher accuracy, it has the disadvantage of introducing phase wrapping ambiguity between different parts of the scene. Within one period of the modulation waveform there are two points that give the same gated intensity, for example. And these two points repeat themselves every 2π of phase. The effect of this is that looking out into a scene (along a long empty road for example) one would see a series of bright and dark "stripes" in the image as distance increases. The ambiguity comes in unwrapping which stripe a pixel or object in the scene belongs to in order to determine its distance.

This problem may be addressed via image processing. For example, computational techniques could be used to determine from the context of the scene which fringe each pixel corresponds to. Or multiple images taken at different phases or delays (delay refers to the case of a single illumination pulse) may be synthesized to assist in disambiguating. Alternatively, multiple sensors operating at different phases or delays or multi-modal approaches may be used—e.g. combining other 3D information from computational image processing or stereoscopic approaches. This may also involve multiple cameras and/or lidar sensors viewing the scene from different angles.

Figure 13:
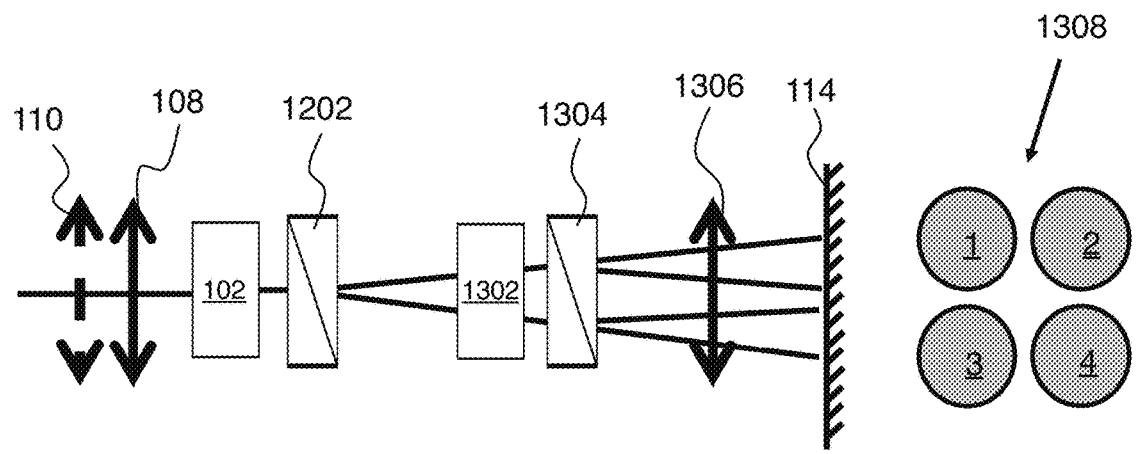
FIG. 13 shows a 4-output double modulation embodiment of the invention.

These unwrapping methods, while feasible, are not ideal. A sensor needs to be able to respond to rapidly-changing, dynamic scenes, and the phase ambiguity would introduce significant challenges. To fix this, a second modulator may be introduced in series with the first (or as a separate camera unit) to provide a second modulation of the scene to unwrap the phase ambiguity. Series modulators and beamsplitters allow multiple optical modulations to be encoded in an array of detected images. Two modulators and two beamsplitters yields four images which encode pairwise in their pixel-by-pixel intensities the two modulation waveforms (FIG. 13).

For a first resonant modulation, the peak per-pixel accuracy is approximately given by $$\sigma_{t,1} = \frac{1}{\omega_1 \sqrt{N}}.$$

This peak accuracy is approximately achieved over a certain range interval with ambiguities on rising and falling waveform edges and also on subsequent modulation waveform periods. Let's assume for illustration that we want to address the ambiguity and be able to distinguish every 180 degrees of the first modulation waveform using the second modulation. To accomplish this, the second modulator needs to have $$\frac{1}{\omega_2 \sqrt{N}} < \frac{\pi}{\omega_1}$$

where $$\frac{\pi}{\omega_1}$$

corresponds to a half-period of the faster modulation. The possible improvement in temporal dynamic range is thus $$\sim \frac{\omega_1}{\omega_2} = \pi\sqrt{N}. \qquad 5$$

This affords a dramatic improvement. Further series modulators and beamsplitters may be added, with each stage improving the available dynamic range.

The slower modulator need not be resonantly driven since it can have a significantly slower waveform. For example, conventional high-voltage ramp electronics or high voltage sine drive without resonance may be used. This method of using two modulations to un-wrap the image may also be implemented by combining more than one camera unit to view a scene, each having a different modulation and a central processor synchronizing both units with the illumination and combining the image data.

A5) Single-Shot Advantage

Figure 11:
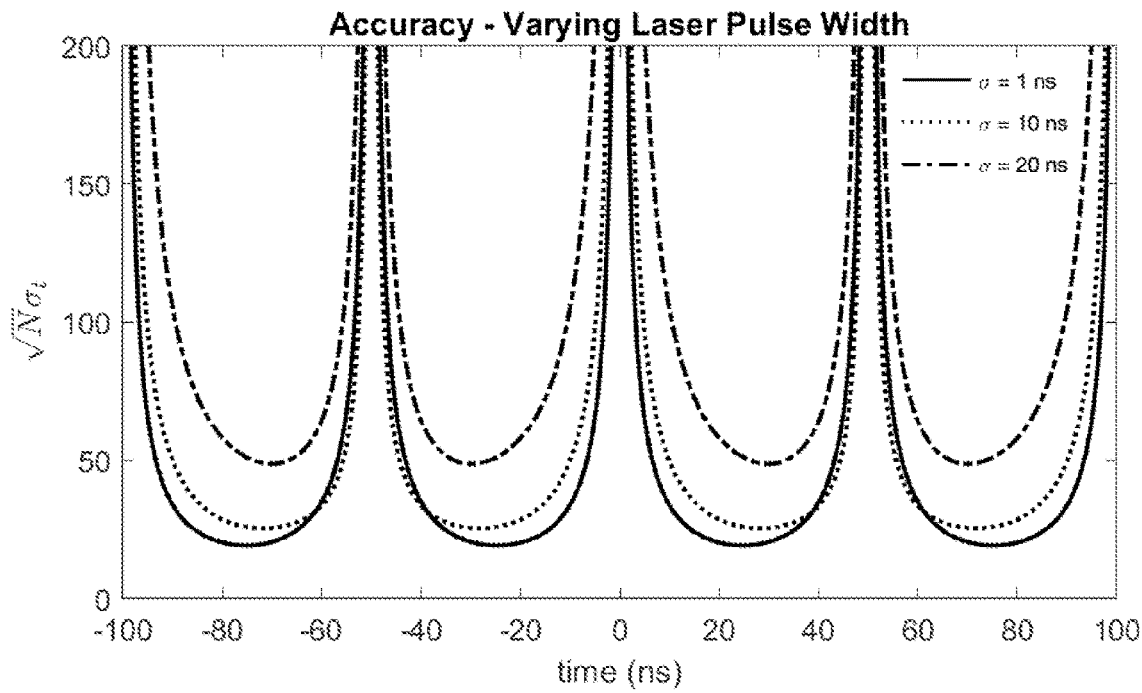
FIG. 11 shows a comparison of LIDAR accuracy for various illumination pulse widths, according to embodiments of the invention.

Photon counting detectors like APDs and SPADs are especially limited in measuring single-shot pulsed waveforms due to their large dead-time. For example, in timing a burst for LIDAR, photon counting registers the first photon at each pixel. Since arrival times are exponentially distributed, this can lead to large measurement error unless a short optical pulse is used. Electro-optic imaging can instead estimate a parameter of a single-shot waveform that is significantly distributed in time with high precision while also using all available photons. In other words it can attain a temporal accuracy that is not tied by photon statistics to the sharpness or pulse width of the illumination waveform (FIG. 11). In LIDAR, for example, it may be favorable to use a wide laser pulse (lower-cost) for scene illumination compared to short pulses and photon counting.

In the following sections, we show how the drawbacks of conventional electro-optics, including limited angular acceptance and the required high-voltage electronics, may be overcome to enable simple implementations.

A6) Imaging PC Theory

Conventional designs for PCs are not suited to wide-field imaging with large acceptance angles, similarly modulators require special care when designed for resonant drive having high RF duty cycle. Most commercial units are either longitudinal electric field potassium dideuterium phosphate (KD*P) crystals with ring electrodes or small aperture (low-voltage) lithium niobate ($LiNbO_3$) or lithium tantalate ($LiTaO_3$) modulators with transverse electric field. The latter are often used in laboratory applications as phase modulators—e.g. to apply sidebands to single-mode laser beams. Long crystals (>10 mm) are typically used in both. For imaging, acceptance angle is much more important than polarization extinction as a figure of merit, and it is instead desirable to use shorter crystal lengths, planar configurations, and configurations that allow compensation of off-axis birefringence.

Prior imaging approaches with PCs have either involved single crystal longitudinal KD*P PCs for imaging with low acceptance angle and at long-range (e.g. LIDAR from an aircraft or laser ranging through a telescope) or they have used transverse modulators that may be quite bulky. To reduce drive voltage, segmentation of a transverse modulator (perpendicular to the optical axis into a layer-cake structure) has been proposed. Such a segmented modulator limits where the PC may be placed in imaging optics due to diffraction effects and distortion of the image. In the following we describe imaging modulator configurations which may be placed anywhere in an optics train—especially including as an aperture element, at image or diffraction planes, or integrated directly against the camera sensor.

We have analyzed electro-optic configurations to identify those best suited to wide-FOV applications. Off-axis rays are treated by applying a coordinate rotation to the index ellipsoid. For a general electro-optic crystal this index ellipsoid may be written as:

$$\left(\frac{1}{n_{x_1}^2} + r_{1j}E_j\right)x_1^2 + \left(\frac{1}{n_{x_2}^2} + r_{2j}E_j\right)x_2^2 + \qquad (2)$$

$$\left(\frac{1}{n_{x_3}^2} + r_{3j}E_j\right)x_3^2 + 2x_2x_3r_{4j}E_j + 2x_3x_1r_{5j}E_j + 2x_1x_2r_{6j}E_j = 1.$$

Here $r_{ij}$ are elements of the electro-optic tensor. If the propagation axis is $x_i$, an off-axis ray is treated by performing a coordinate rotation about the two other crystal axes by angles $\alpha$ and $\beta$ respectively: $y=R_{xj}(\beta)R_{xk}(\alpha)x$. The principal axes of the transformed ellipsoid in y coordinates correspond to the off-axis refractive indices, which are then used to calculate retardance. The off-axis ray's intensity is evaluated through crossed polarizers using Mueller matrices, where the PC is treated as a homogeneous linear retarder using the calculated retardance and rotation angle of the y ellipsoid. Transmission is plotted vs. ray angles $\alpha$ and $\beta$ to create an isogyre or conoscopic interference pattern which informs the angular FOV for theoretically ideal crystals. In the following sections we detail several ideal imaging modulators and their properties.

An important detail of some of the multi-layer modulators that we disclose for imaging involves the non-commuting nature of sequential polarization elements or Mueller matrices. Stated otherwise, interleaving of multiple electro-optic and/or birefringent material layers can result in altered performance for off-axis imaging when compared to equivalent thicknesses of single crystal materials. This is important in certain configurations that further optimize for wide-FOV.

A6a) Longitudinal Single Crystal

Figures 5A, 5B:
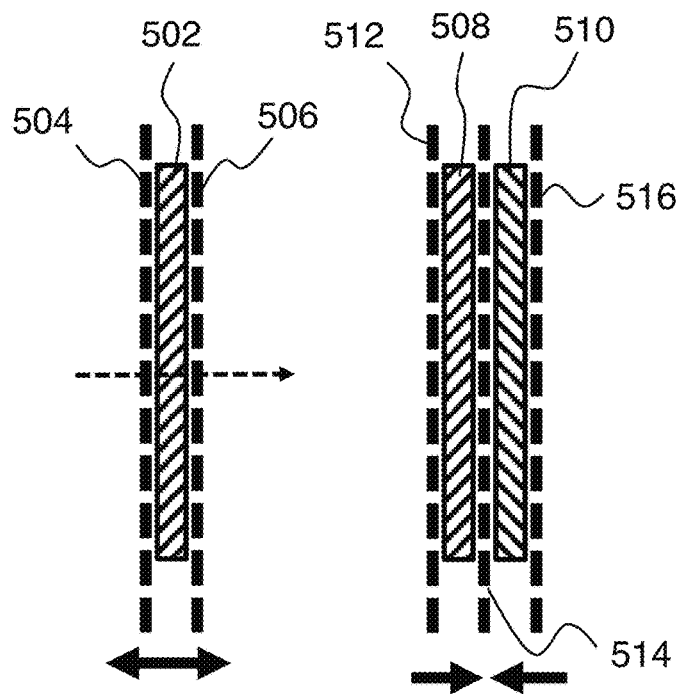

KD*P is the most common material for wide-aperture Pockels cells and is widely used in Q-switching and pulse-picker applications. It uses the $r_{63}$ electro-optic coefficient and has a half-wave voltage around 3800 V for 633 nm. However, most KD*P modulators use long crystals which limit acceptance angle to a few mrad due to off-axis birefringence. They are also susceptible to piezoelectric resonances when pulsed. Acceptance angle may be significantly improved by making the crystal thinner to reduce off-axis phase shifts. This can increase the acceptance angle to ~20 mrad for a 3 mm thick crystal that can be simply constructed (FIG. 5A). For longitudinal configurations, thinner crystals increase capacitance for the same $V_\pi$, which may increase rise-time or require higher drive current. Overall, thin KD*P provides a simple implementation for imaging modulators, however it has limited field of view and also is a difficult (and more expensive) material to manufacture due to its being hydroscopic (water soluble) and relatively fragile.

A6b) Longitudinal Multi-Crystal

Making longitudinal crystals thinner results in a wider field-of-view. However, the half-wave voltage remains the same at all thicknesses. One approach to reduce voltage is to divide the crystal into a multi-layer longitudinal stack with alternating electrode voltages. Breakdown remains a problem in these schemes since they have the same electric field.

Another complexity is that they require electrodes that allow light to pass through the modulator while also providing an electric field along the optical axis.

We have found it is possible to generate longitudinal modulators with wide field of view and extremely low materials cost by multi-layer methods. Important to these is often compensation for on-axis and/or off-axis birefringence effects. This may be accomplished by alternating the orientations and/or compositions of layers in the stack relative to others. One known method for KD*P modulators is to employ a birefringent crystal of opposite axiality having no E-field applied (or not EO active). In the off-state, KD*P modulators are negative uniaxial, allowing off-axis errors to be fully compensated by addition of a positive uniaxial compensating crystal like $MgF_2$ or $YVO_4$. While compensation is theoretically perfect in zero-field conditions, angular FOV remains limited to $\sim\sqrt{2}$ improvement in the high-voltage 'on' state where KD*P becomes biaxial. Further dividing the modulator into multiple thinner layers may have the effect of improving the FOV in passively compensated schemes (e.g. KDP-MgF2-KDP-MgF2). In theory the thinnest unit may set the acceptance angle, though this may be significantly different than the practical results.

Liquid crystal elements or thin layers of stressed plastic films may be used as birefringent compensators. Such films have been used to improve the viewing angle of LCD screens. Compensator crystals may also be employed for longitudinal modulators where the z-axis does not align with the optical axis or the electric field direction. Compensators may be uniaxial or biaxial, or have arbitrary symmetry and relative refractive index values.

Multi-element longitudinal modulators may be constructed with each element having separate applied field. In one embodiment, each crystal in the stack is rotated $\theta$ degrees relative to the previous with alternating electric field directions (or equivalently having interleaved half-wave plates and the same field direction). In another embodiment, oblique cut (not cut along standard X, Y, or Z axis) wafers of electro-optic materials are employed to further minimize driving voltage. In some embodiments, pairs of wafers are oriented at 180 degrees (or θ1) with E-field pointing in the same direction to define a unit, and then these units may be further stacked with 90 degree (or θ2) rotations.

In modulators where the Z-axis of the crystal does not coincide with the propagation axis of the light, there is a large net birefringent phase shift. This may be canceled by providing an equivalent crystal rotated 90 degrees (or after a half wave plate). However, it is not strictly necessary to provide birefringence compensation when imaging with narrow-band light having one spectral component such as for LIDAR. When wide-band response is required (e.g. fluorescence imaging) such compensation can be important, and it also improves the thermal stability of the modulator. Tunable birefringence compensators (like Soleil-Babinet or sliding wedges) may also be employed. Liquid crystal layers or spatial light modulators may also be used.

Some configurations may be used to create a fringe pattern across the image field which then shifts with applied voltage. Any spatially dependent gating pattern $g(x,y,t)$ may be used for time-resolved imaging methods described here. The position in the imaged scene is mapped to a known gating response of the Pockels cell which can then be used for temporal parameter estimation. In this way, shifting fringes or motion of isogyre/conoscopic interference patterns may be used to advantage.

Longitudinal modulators have the advantage of being simple and low-cost. For resonant operation, they require care to prevent excessive electrical losses on the planar electrodes. This may be accomplished by limiting the RF duty cycle, or by choosing electrodes having low sheet resistance. Conventionally layers of conductive oxides like Indium Tin Oxide are used that may have higher resistive losses. Lower resistance may be achieved with ring electrodes (e.g. thin foil washers), conductive meshes, and metal screens. Generally any conductive film, mesh, foil, or layer may be used. Electrodes may also be patterned (e.g. a mesh or grid defined in an evaporated metal coating).

The configurations described here can generally include additional polarizer, compensator, electrode, and/or waveplate layers as necessary to maximize field of view and imaging performance. Some layers may be misaligned or tilted at an angle relative to the optical axis. A quarter wave-plate between polarizers may be used to center the switching voltage range of a modulator around zero with, for example, $\pm V_\pi/2$ corresponding to ON/OFF gating instead of 0 and $V_\pi$. This reduces the required drive amplitude and can help prevent dielectric breakdown across thin crystals. Also, note that n-layer modulators operate at reduced voltage ($V_\pi/n$) but increased capacitance.

A6c) Transverse Modulators—Single and Multi-Crystal

Thin longitudinal modulators are compact and inexpensive, but transverse designs offer lower capacitance and even larger acceptance angles. Since transparent conductive electrodes (or meshes, etc.) are not required, optical loss may be very low with anti-reflection coatings, and resistive losses are kept to a minimum for high Q resonant drive. Transverse PCs are typically constructed from a pair of crystals oriented at 90 degrees and having opposite field directions to cancel on-axis birefringence and thermal effects. This configuration is ideal for imaging when given a large aperture. Specifically, the commercially available configurations for $LiTaO_3$ (LTA) and $RbTiOPO_4$ (RTP) modulators can provide near-perfect theoretical off-axis cancellation. This is well known in the art in other applications. This happens because their optical axis is perpendicular to the propagation axis of the modulator. In practice, effects like crystal strain and alignment errors will limit the FOV, so crystals should still be as short as possible to maximize performance. LTA is particularly attractive for imaging applications due to its low birefringence. Low capacitance transverse modulators enable high frequency resonant operation, and they can also be incorporated into 50 ohm transmission lines.

Like longitudinal modulators, transverse modulators may also be realized in planar configurations. Furthermore, for imaging it is not strictly necessary to have the off-axis compensation afforded by a second crystal. For example, LTA has a low degree of intrinsic birefringence and can provide a large field of view using a single crystal when imaging with a narrow spectral band. A static compensator may also be used with no applied field to cancel the intrinsic on-axis birefringence.

The configurations we describe are compatible with a variety of standard electro-optic materials. These include but are not limited to Potassium Dideuterium Phosphate (KD*P or DKDP), Lithium Niobate (LNO), Lithium Tantalate (LTA), and Rubidium Titanyl Phosphate (RTP). Any electro-optically active crystal (of any symmetry group), ceramic, composite, or polymer material may also be used. For imaging at long wavelengths, different crystal types may become favorable due to their transmission including CdTe, ZnTe, and GaAs.

In summary, our analysis indicates several ideal imaging configurations: thin longitudinal (e.g. KD*P), multi-layer longitudinal (e.g. KD*P and LNO), and dual-crystal compensated transverse modulators (e.g. LTA and RTP). Depending on application, the desired acceptance angle (angular field of view) may vary. In fluorescence imaging applications, relatively low acceptance angles may be compatible with microscope optics having large magnification (e.g. in infinity space of an objective lens). In wide-field imaging though, the acceptance angle may need to be >1 degree, >5 degrees, or even >20 degrees depending on application. In theory high acceptance angles that are comparable with standard cameras and with human vision may be achieved with suitable crystal and compensator designs. Other important parameters we did not mention above include the crystal's dielectric loss tangent and piezoelectric response.

A7) Resonant Drive Description

Figure 4:
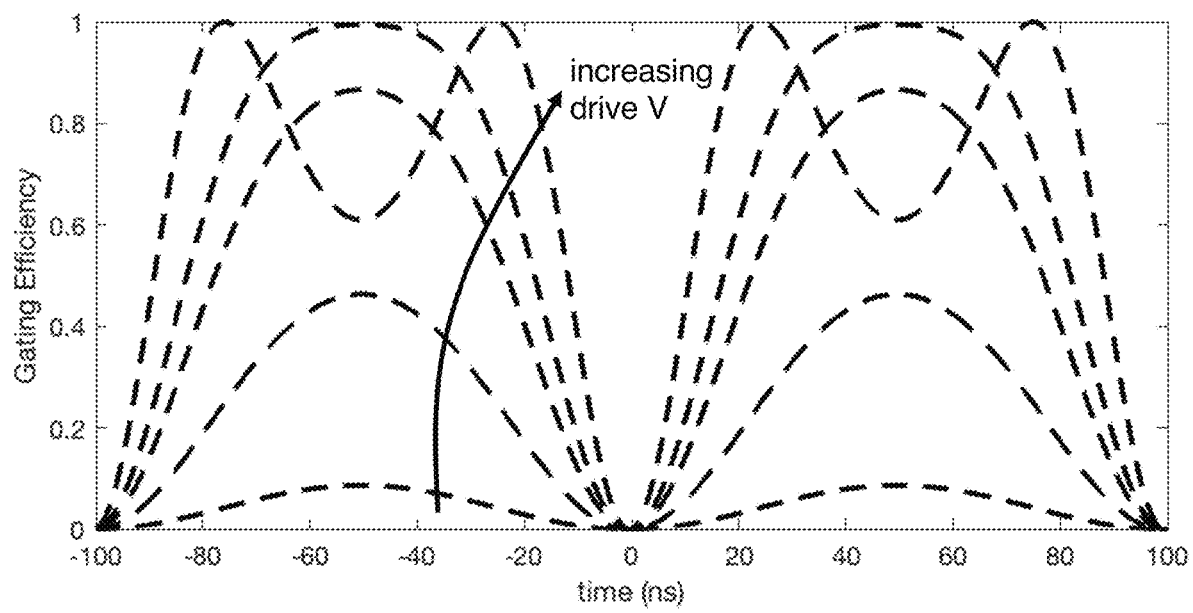
FIG. 4 shows modulator gating waveforms for several different drive voltages.

Electrical power and thermal dissipation are important considerations for LIDAR systems. When driving EO modulators, producing high voltage waveforms is often a significant limitation. Electrically resonant drive provides a means of recycling power and building up voltage for multiple cycles of modulation on the Pockels cell. The resonant gating function looks like $\sin^2(C\, V_p \sin(\omega t))$ where constant C gives the strength of the electro-optic effect, $V_p$ is the peak driving voltage on the crystal, and $\omega$ is the drive frequency. At low drive amplitudes this approximates a sinusoidal function, but for high drive amplitudes the gate function is sharpened by harmonic content to produce a more pulse-shaped periodic waveform (FIG. 4).

The resonant voltage enhancement on the capacitor in a series LC resonator is determined by the quality factor $Q=\omega L/R$. This factor also determines the time scale of ring-down and build-up for the resonant voltage waveform. Resistance R is typically dominated by parasitic components arising from losses (both resistive and dielectric).

Electrically resonant drive refers to a circuit where the PC acts as a capacitor in a passive resonator (e.g. LC, LRC, resonant transformers, transmission line or waveguide resonators). The resonant frequency may be either dominantly determined by the PC capacitance and a circuit inductance or it may be set by auxiliary capacitors (e.g. to lower drive frequency when PC capacitance is small). Resonant networks having multiple resonant frequencies may be designed as well to either support multi-frequency modulation or rapid switching or tuning between different resonant drive bands.

The PC's capacitance may be anywhere between 1 pF and 1 nF in most instances. Resonant frequencies of interest are between 500 kHz and 1 GHz—these correspond to periods on the scale of light time-of-flight in a scene. The inductor may either be a stand-alone wire-wound coil (air core or various core materials) or a planar coil realized on one or more layers of a multi-layer circuit board or a stack of multiple circuit boards having coils electrically or magnetically coupled. The resonant circuit comprising the inductor and PC (referred to as the tank) may be driven in series in direct connection with an RF source or via coupling to another inductor. When magnetically coupled to another inductor, a resonant transformer is created where the secondary winding comprises the tank inductor and the primary winding is connected to the driving source.

In some cases, a modular approach is followed where the resonant circuit (series or transformer) is driven by a separate RF source having a fixed impedance (commonly 50 or 75 ohm). This RF source is then impedance matched to the resonant circuit either by the geometry/design of the matching coil (in inductively coupled designs) or through the use of a matching network. Transmission lines like coaxial cables or waveguides may be used to separate these RF circuit elements. Coils may be bulk elements or planar elements. Planar elements may be defined on separate layers of a multi-layer structure or printed circuit board to take advantage of inductive coupling.

Figure 3A:
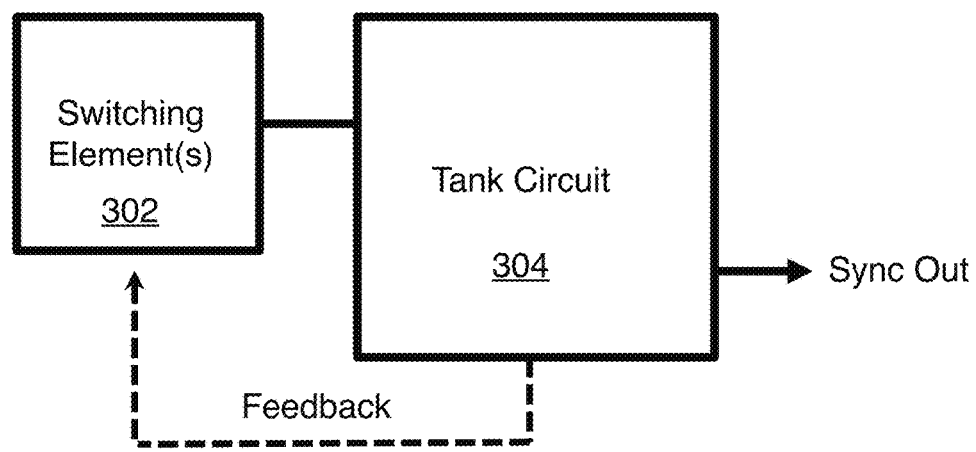
FIGS. 3A-B show further examples of providing resonant drive to an EO modulator.
Figure 3B:
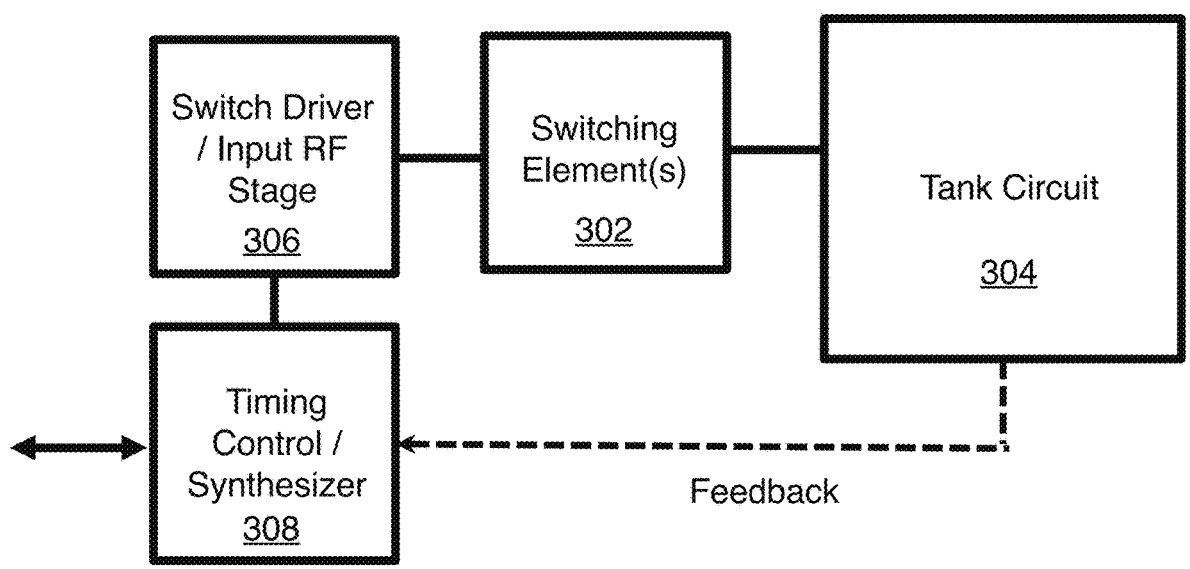

Resonant transformers may be driven and designed in many different topologies. Switching electronics may be directly integrated to drive the primary coil. These include resonant Royer oscillators, Armstrong oscillators, Hartley oscillators, Colpitts oscillators, and various other common self-oscillating feedback circuits. The primary coil may be driven with single switch elements or multiple elements arranged in push-pull, half or full-bridge configurations, and/or with multiple elements in series/parallel for example. The RF switch employed may be driven via feedback from the resonant circuit or via a separate RF stage tuned to the desired resonant frequency (FIGS. 3A-B). Many such topologies have been described for class-E amplifiers and solid-state Tesla coils which are similar in concept to the circuits described here. Resonant switching at zero voltage or zero current points may be used to maximize efficiency of the active components. This may be implemented for example in high-efficiency class-E circuits. Modern high-efficiency semiconductors including for example gallium nitride (GaN) or silicon carbide (SiC) may be used as well as standard silicon transistors and even vacuum tubes. Dual resonance of the primary and secondary coil may also be exploited wherein both primary and secondary constitute a tank circuit tuned to the same frequency. Further, a non-resonant transformer may be used as an input or voltage-boosting stage before the resonant tank elements. Various choke or blocking inductor coils may also be included.

Hybrid "ring-down" drive approaches may be used where an impulse is applied to a resonant LC circuit which is then allowed to ring-down and generate a periodic gate waveform. Similarly, pulsed RF may be used to limit the duty cycle of the resonant drive circuit and only drive the PC during certain intervals corresponding to the camera exposure and/or laser pulse emission to the scene being imaged. A low-duty cycle pulsed RF drive allows for higher peak voltages while limiting thermal effects. In the pulsed RF case, each pulse of RF may correspond to a single emitted illumination pulse or a similarly pulsed duty cycle periodic illumination waveform. Alternatively, pulsed RF may be synchronized with camera exposures with continuous illumination waveforms.

Various core materials (e.g. ferrites) may be used in the inductors or in proximity to planar coils. Similarly, trim or tuning inductors and capacitors can be added to adjust the resonant frequency of the circuit or to enable variable impedance matching.

Provisions for radio frequency shielding (EMI/RFI) may be added to the assembly in order to prevent unwanted emissions and to prevent cross-talk between the tank circuit and the signal generating and feedback electronics. Standard design methods and mitigation strategies may be used.

A8) Integration and Multilayer Stack

Integrating the PC with the resonant circuit can afford important advantages. It serves to reduce parasitic inductance and capacitance due to electronic leads and connections. Conventional Pockels cells are typically used with a separate drive unit which is connected to the crystal package through a length (typically >1 cm) of wire leads. This crystal package is generally bulky and involves its own internal wire connections or foil. For resonant drive, such connections may be detrimental to the quality factor of the resonator and limit the voltage enhancement (equal to Q in series LC circuit) that is achievable for a given driving voltage. Integration also allows for a reduced form factor, particularly when planar coils are used.

Multilayer stacks may be implemented that are compatible with on-chip integration (e.g., FIGS. 7A-C, 8A-B). This could prove valuable for applications requiring low cost, size, and power—for example consumer electronics. The image formation element (conventionally a lens) may be any thin optic that allows for computational image reconstruction. This includes microlens arrays, holographic lenses, geometric phase lenses, free-form optics, coded apertures, etc. In multilayer use cases, required device aperture might be very small (mm scale) which can further reduce transverse PC drive voltages. The modulator may again come before or after the image formation element in the multilayer stack.

Inductors may be realized as discrete components or as planar elements. Planar coils and resonant transformers may be realized through standard PCB or MEMS fabrication methods. Transmission line resonators may also be defined, e.g. using coplanar waveguide, microstrip, stripline, or other transmission line geometries.

A9) Means for Signal Generation and Phase Control

Signal generation and phase control may be integrated on-board or off-board to provide a low power waveform that then directly drives a switching element, other RF-stages, or gate driver electronics. The phase of the applied RF and the illumination waveform must be synchronized. This may be accomplished via standard methods including phase locked loops or direct digital synthesizers (DDS).

Feedback may be used to maintain the RF switching to the tank circuit resonance and also to control the amplitude and phase of the resulting high voltage and optical gating waveforms. This may take the form of direct feedback (e.g. electrical connection from the tank circuit) applied to the switching element, or feedback applied after measuring phase/amplitude used, for example, to adjust the drive signal being generated or to control a phase shifting or attenuating element. Phase and amplitude may be measured from the high voltage electronic signal or from the optical gating waveform. Feedback may also be applied to tunable circuit elements to shift the resonant frequency. This may be useful in compensating thermal drift.

For feedback, an optical phase reference beam may be used to directly probe the PC gating waveform. Such an optical reference may operate concurrently with use of the imaging apparatus. The optical reference beam may take a separate path through the crystal, have separate detectors (e.g. photodiodes), or have a separate wavelength from the light being imaged from the scene to allow its beam to propagate through the assembly and be split off with wavelength selective dichroic mirrors.

A10) Thermal Considerations

At high switching frequencies, heating of the PC crystal and electronics and/or switching elements may begin to occur. In particular parasitic resistive losses at RF drive may heat up tank circuit coils (or magnetic losses may heat inductor core materials) and electrode materials, likewise dielectric losses in the circuit materials and PC crystal itself can occur. Thus, it is desirable to minimize the dielectric loss tangent when choosing circuit materials. Depending on the frequency and duty cycle of RF drive, it may be desired to provide cooling means to the circuit elements and PC crystal itself. Such means may include heat pipes and heat sinks (ceramic or metallic), thermally conductive circuit board materials, thermoelectric coolers, liquid cooling pipes connected to a radiator or chiller, forced air, or even immersed dielectric liquid cooling of the whole assembly (e.g. using fluorinated coolants, oils, or water). In addition to cooling through their electrodes, crystals may be cooled or temperature regulated via thermally conductive but optically transparent plates used to sandwich the modulator assembly or interspersed within it (e.g. glass, sapphire, or transparent ceramics). These plates may connect to heatsinks, heat exchangers, and/or thermoelectric coolers. The skin depth at the operating frequency should also be considered when designing RF circuits in order to minimize coil heating and resistive losses. Thermally conductive or ceramic PCB materials may also be used. Inductors may be made out of hollow tube to allow for liquid cooling.

A11) Electrodes and Breakdown

Thin longitudinal crystals and multi-crystal stacks require care to avoid electrical breakdown. Thin insulating boards (e.g. ~500 micron thick PCBs) may be used to define spacers with cut-outs for each crystal to allow layer-by-layer assembly. These PCB spacers can provide electrical connections to conductive transparent layers sandwiching each crystal unit and they may provide insulation. One or more crystals can be encased in each ITO glass—PCB(crystal)—ITO glass unit. Any transparent conductive coating, layer, or film may be used instead of the ITO glass.

Optical epoxies and various potting compounds may be used to assemble/fill the layers and encase the crystal assembly. Similarly, epoxy may be used to adhere the various crystals to electrode layers. De-bubbling procedures may be necessary. In some embodiments, the spatial extent of the electrodes exceeds that of the crystals in area. In this case the electrodes must have sufficient gap where they overhang to not breakdown (or be insulated from each other with appropriate material). In other embodiments the crystals' area may exceed that of the electrodes, and connections may be provided to the electrodes from the sides in such a way as to avoid forming a breakdown path (e.g. alternating directions).

In general, standard circuit board, microelectromechanical systems (MEMS), and microfabrication processes may be employed to assemble a multi-layer device. For example, this might include wire-bonds, evaporated electrode coatings applied directly to crystal surfaces, or even direct deposition of active layers in the stack onto a substrate.

A12) Multi Camera Systems

As discussed earlier, multiple scene images at different waveform delays or phases may be combined to achieve normalization for LIDAR acquisition, or to improve the range and/or uniformity of measurement accuracy within a scene. Dual series modulators may be used to extend the dynamic range of a resonant imaging LIDAR measurement by removing phase ambiguities.

Other dual modulation approaches are enabled by employing multiple camera systems. For example, two or more cameras may view a scene while using different gating waveform phases or frequencies. This may remove phase ambiguity without relying on the more complex dual series modulator configuration. A central control and processing unit synchronizes the modulations and processes the combined image data of multiple cameras. Likewise, multiple camera units with different polarizer configurations may be configured to measure G and U simultaneously, or a standard non-modulated camera may be used to image scene intensity directly to use for normalization.

A multi-camera system may be distributed to take advantage of multi-mode data (e.g. combination with stereoscopic ranging). Similarly, a multi-camera system may enable multiple viewing perspectives from a moving object like a car or drone.

B) Exemplary Embodiments

FIG. 1A shows a first exemplary embodiment of the invention. This example is an integrated time-resolved optical imaging device that includes an image formation element 108 and an integrated assembly 106. Integrated assembly 106 includes a planar imaging detector array 114, where the image formation element is disposed to provide an image of a scene being viewed to the planar imaging detector array. Integrated assembly 106 also includes a first optical intensity modulator including at least one first planar electro-optic (EO) element 102 configured to modulate a state of polarization of light passing through the planar electro-optic element. Here the first optical intensity modulator includes the first planar electro-optic element 102 sandwiched between polarizers 110 and 112.

The first optical intensity modulator is configured to modulate the image at the planar imaging detector array 114. The temporal bandwidth of the first optical intensity modulator is greater than the temporal pixel bandwidth of the planar imaging detector array. In other words, the optical modulation is faster than the detector response, so improved time resolution is provided via the optical modulation.

The integrated assembly 106 includes drive electronics 104 configured to deliver a voltage waveform having voltage peaks of 200 V or more to the first planar electro-optic element 102. The drive electronics includes a passive electrical resonator (schematically shown on FIGS. 1A-B with inductance 116, see also FIGS. 2A-B), and the drive electronics is configured to excite one or more resonant frequencies of the passive electrical resonator.

Figure 1B:
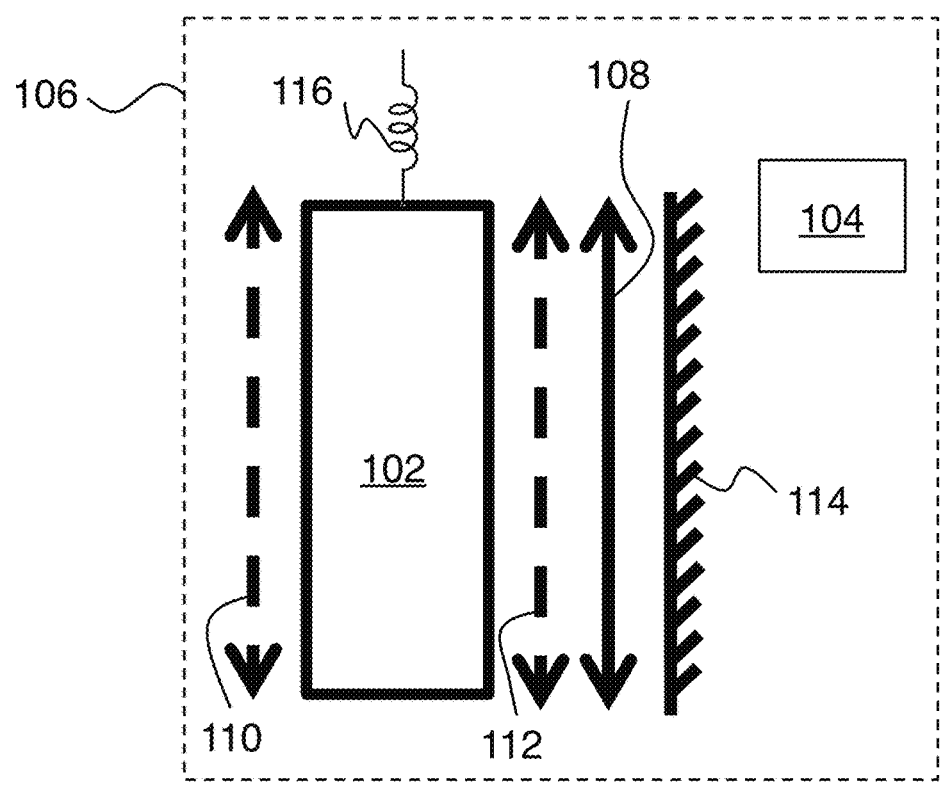

In the example of FIG. 1A, image forming element 108 is disposed before the first planar electro-optic element 102. The example of FIG. 1B is similar to that of FIG. 1A except that image forming element 108 is disposed after the first planar electro-optic element 102. Thus the integrated assembly 106 may (FIG. 1B) or may not (FIG. 1A) include the image formation element 108. The configuration of FIG. 1B may be suitable in cases where the imaging device is receiving an image from an earlier optics stage.

The optical bandwidth of the integrated optical imaging device is preferably 50 nm or more for broadband applications such as fluorescence lifetime measurements. The optical bandwidth can be narrow (e.g., 10 nm or less) for LIDAR applications.

Preferably, the ratio of an aperture width to the thickness of the planar electro-optic element is 3 or more, where the thickness is defined as the dimension through which light propagates as it passes through the planar electro-optic element.

For LIDAR applications, a light detection and ranging (LIDAR) image is obtained by modulated illumination of the scene being viewed. Let the scene have a depth of field DOF, and let c be the speed of light. Then a period of the modulated illumination can be greater than 2*DOF/c or it can be less than 2*DOF/c. The first case corresponds to operation of conventional flash LIDAR, with no phase wrapping ambiguity. The second case has a phase ambiguity problem as described above. See also FIGS. 13-15 for a presently preferred approach for dealing with phase wrapping in the second case.

Figure 2A:
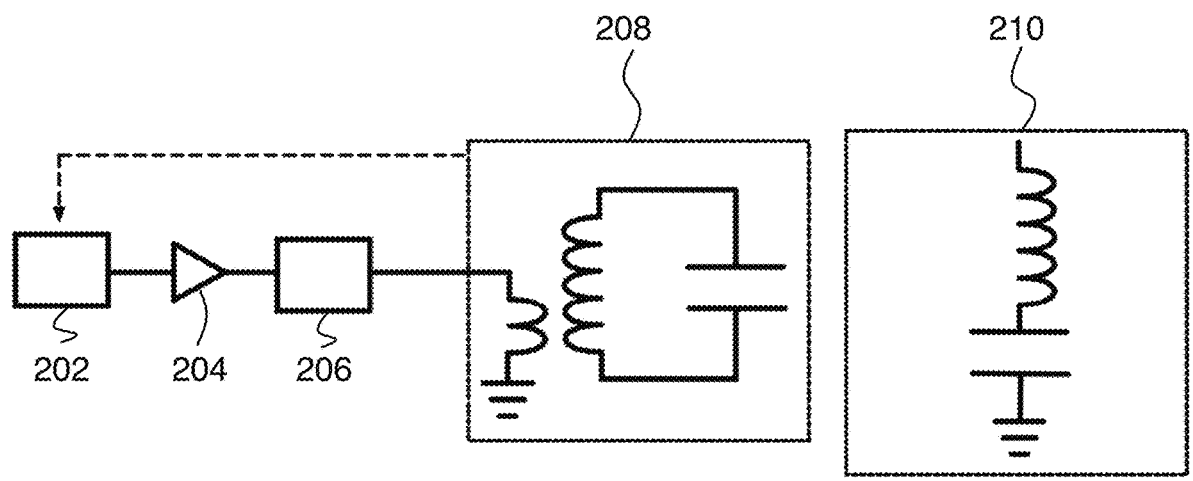
FIGS. 2A-B show examples of providing resonant drive to an EO modulator.

FIG. 2A shows examples of resonant drive circuits. Here RF signal source 202 drives amplifier or switching element 204 which in turn drives an impedance matching network 206. The output of impedance matching network 206 drives the passive electrical resonator referred to above. Here 208 and 210 are two examples of such passive resonators—resonant transformer and series tank, respectively. The capacitance of the first planar electro-optic element is preferably included in the passive electrical resonator. In other words, the capacitance C of the LC resonator is preferably provided, in part or in full, by the capacitance of the EO element. The necessary inductance is provided as part of the drive electronics.

Figure 2B:
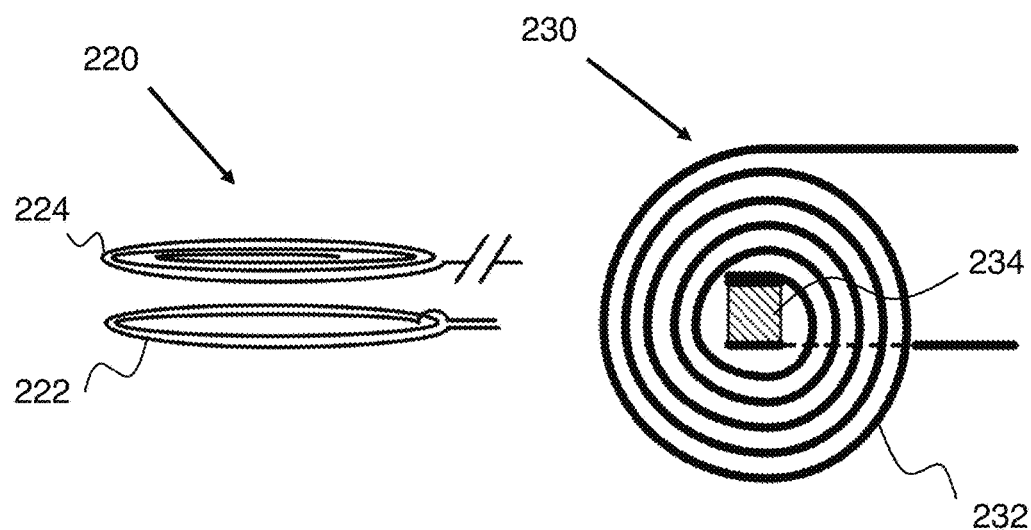

FIG. 2B shows some examples of how the passive inductance can be provided and/or integrated with the EO element. In the configuration of 220 (side view), coils 222 and 224 are in different layers (e.g., different layers of a multi-layer printed circuit board). This can provide a transformer as in 208 of FIG. 2A. In the configuration of 230 (a top view), a series inductance is provided by having a trace 232 coiled around the modulator element 234, as shown. This can provide a series tank as in 210 of FIG. 2A. Thus the first planar electro-optic element is preferably integrated with the passive electrical resonator on a single circuit board.

FIG. 3A shows an example of self-resonant drive—where the tank circuit 304 provides feedback to the switching elements 302 to maintain resonant drive. This may create a simple, free-running high voltage oscillation. An out-going sync can be used for phase locking other elements like an illumination source to the frequency reference thus provided.

FIG. 3B shows an example of tuned resonant drive. Here RF power elements 306 and 302 controlled by a timing signal 308 are in-resonance with the tank circuit 304. Phase and/or amplitude feedback may be provided to the timing control unit 308. Timing control unit 308 may be phase locked to an external signal. Circuits may generally include other standard elements like variable attenuators, filters, transmission lines and coaxial cables, RF switches, phase detectors, impedance transformers, and power and SWR (standing wave ratio) meters.

FIG. 4 shows an example of gating waveforms resulting from resonant modulator drive at a single frequency (5 MHz electrical drive, resulting in 10 MHz optical modulation). Here the effect of increasing the drive voltage is shown by the arrow on the figure. The numerical values for drive voltage on the plot are 0.2, 0.5, 0.8, 1.0 and 1.5, all expressed in units of $V_\pi$, the half wave voltage of the modulator. Increasing drive amplitude sharpens the gating waveform due to the harmonic content of the optical gate (functional form is sin^2 of a sine function). This may improve estimation accuracy for a given drive frequency.

FIG. 5A shows an exemplary single layer longitudinal modulator having EO element 502 and electrodes 504 and 506. Here a longitudinal configuration has an applied electric field to the first planar electro-optic element that is parallel to the light propagation direction through the first planar electro-optic element, as shown.

FIGS. 5B-E show examples of multilayer longitudinal modulators as described above. To briefly recap, series arrangements of multiple crystals are desirable in many cases to compensate for on-axis birefringence (for propagation not along z-axis) or to compensate off-axis birefringence effects and thereby improve viewing angle. Series arrangements with multiple electrodes may reduce the required drive voltage while increasing capacitance. The illustrated stacks may include crystals rotated along the optical axis relative to another (e.g. 90 or 180 degrees but any angle in general). They may also include interleaved compensating layers or waveplates.

FIG. 5B shows a dual element modulator: a pair of EO elements 508 and 510, rotated 90 degrees with respect to each other about the system axis (dashed arrow) and driven to have opposite electric field direction (solid black arrows) with electrodes 512, 514, and 516.

FIG. 5C shows a modulator comprising units, each unit comprising multiple elements of different crystal cuts or angular orientations. Here 518a and 518b are the elements of one of the units, and 520a and 520b are the elements of the other unit. As in the example of FIG. 5B the units are driven to have opposite electric field direction (solid black arrows) with electrodes 522, 524, and 526.

FIG. 5D is an example where an EO element 528 is stacked with a compensating layer 530 which is not an EO active material. Here electrodes 532 and 534 provide the drive voltage.

FIG. 5E is an example where EO elements 536, 540, 544 are alternately stacked with compensating layers 538, 542, 546. Here electrodes 548 and 550 provide the drive voltage.

Thus the first optical intensity modulator can include one or more additional planar birefringent optical elements. In such cases, at least one of the additional planar birefringent optical elements can be a second planar electro-optic element driven by the drive electronics.

FIG. 6A shows an exemplary single layer transverse modulator. Here a transverse configuration has an applied electric field (black arrow) to the first planar electro-optic element 602 that is transverse to (i.e., perpendicular to) the light propagation direction (dashed arrow) through the modulator, as shown.

Thus the first planar electro-optic element can be configured as a transverse element having an applied electric field perpendicular to the light propagation direction through the first planar electro-optic element.

FIG. 6B shows a combination of an EO crystal 602 with one or more birefringent compensating elements 604.

FIG. 6C shows a standard dual-crystal 90 degree arrangement including EO elements 602 and 606 which achieves intrinsic birefringence compensation. This configuration is industry standard for LTA and RTP modulators.

FIGS. 7A-C show exemplary integrated Pockels cell configurations constructed with low-cost wafer materials. In the example of FIG. 7A, Transparent conductive (e.g. indium tin oxide coated glass) electrodes 706 are soldered to each side of planar PCB (printed circuit board) layers having cut-outs for the EO crystals 702 and 704 (thereby sandwiching each crystal element). Assembly and insulation can be provided by optical epoxy. Such an epoxy can provide index matching and help prevent breakdown, as described above. The example of FIG. 7A is a two crystal longitudinal configuration. The example of FIG. 7B is a two crystal transverse configuration having crystals 712 and 714. The example of FIG. 7C is a single crystal transverse configuration having crystal 722. More generally standard MEMS and chip manufacturing techniques may be employed to assemble the stack, and conductive coating layers may be deposited directly onto crystals in the multilayer stack rather than being separate layers. Thus integration can be done with MEMS or microfabrication technology or stacking and soldering printed circuit boards, or any combination of these approaches.

Figure 8A:
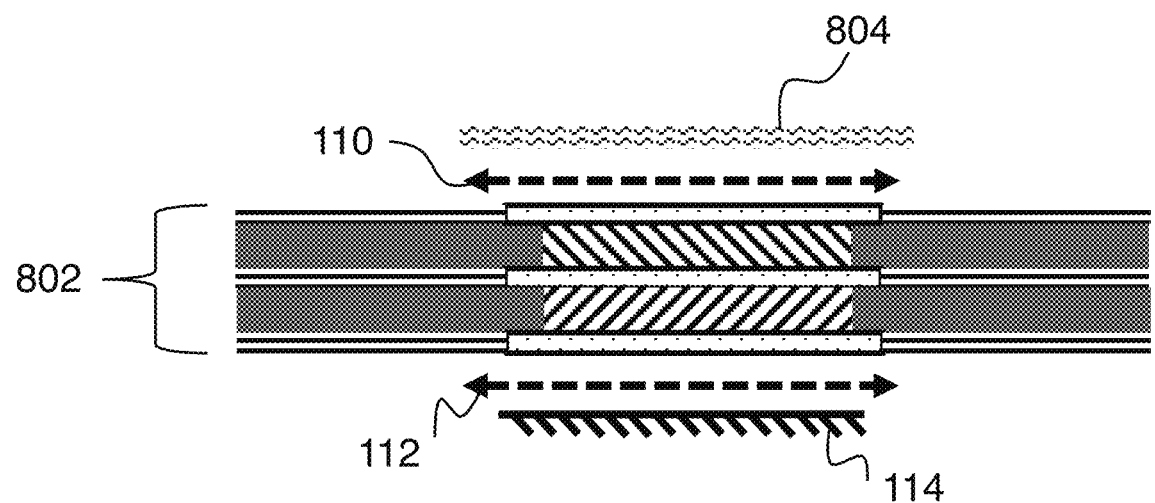
FIGS. 8A-B show two exemplary integrated modulator+detector+imaging optics configurations.
Figure 8B:
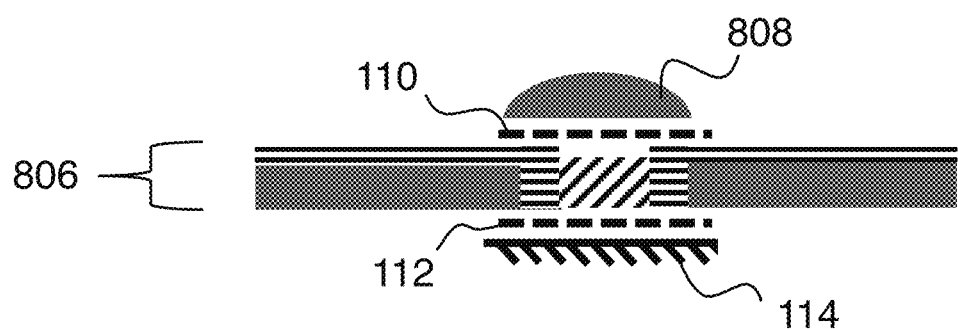

FIGS. 8A-B show examples of further integration of Pockels cell structures as on FIGS. 7A-C.

The example of FIG. 8A is a longitudinal intensity modulator where 802 is a Pockels cell assembly as on FIG. 7A. Here 804 is the image formation element, and 110, 112 and 114 are as described above in connection with FIG. 1A. The example of FIG. 8B is a transverse intensity modulator where 806 is a Pockels cell assembly as on FIG. 7C. Here 808 is the image formation element, and 110, 112 and 114 are as described above in connection with FIG. 1A. The image formation elements 804 and/or 808 may be either a conventional lens, a free-form lens, or a thin element like a holographic optic, a microlens array, or any element enabling computational image reconstruction. Thus the integrated assembly can be configured as a multilayer stack. In both cases (FIGS. 8A and 8B) the image formation element may also be located behind the modulator element.

Figure 9A:
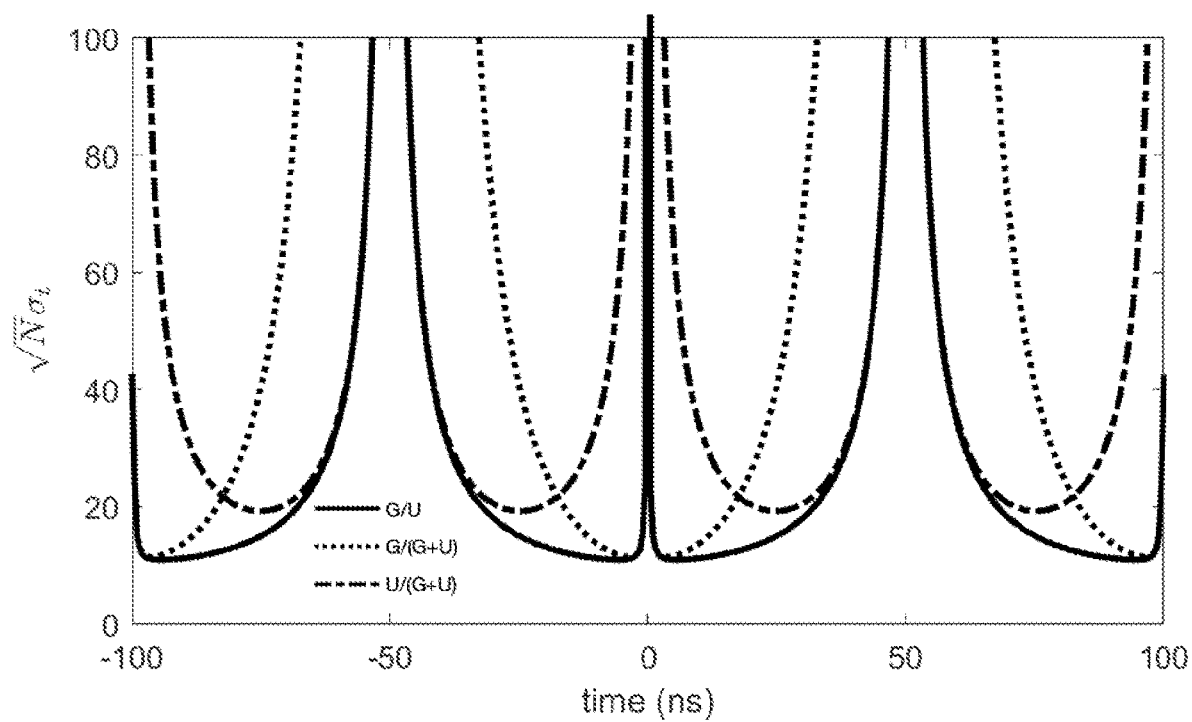
FIG. 9A shows LIDAR accuracy for several different normalization schemes.

FIG. 9A shows estimation accuracy of pulse arrival time (photon number normalized) for three possible ratio estimators. Plot parameters are 5 MHz RF drive (10 MHz optical modulation) using σ=1 nanosecond illumination pulse waveform at 10 MHz. The dotted lines give accuracy possible when detecting only a single polarization state through crossed or parallel polarizers, and normalizing by taking frames at different modulation delays or phases. Note the periodic minima (best accuracy) and also the divergences at certain ranges.

Figure 9B:
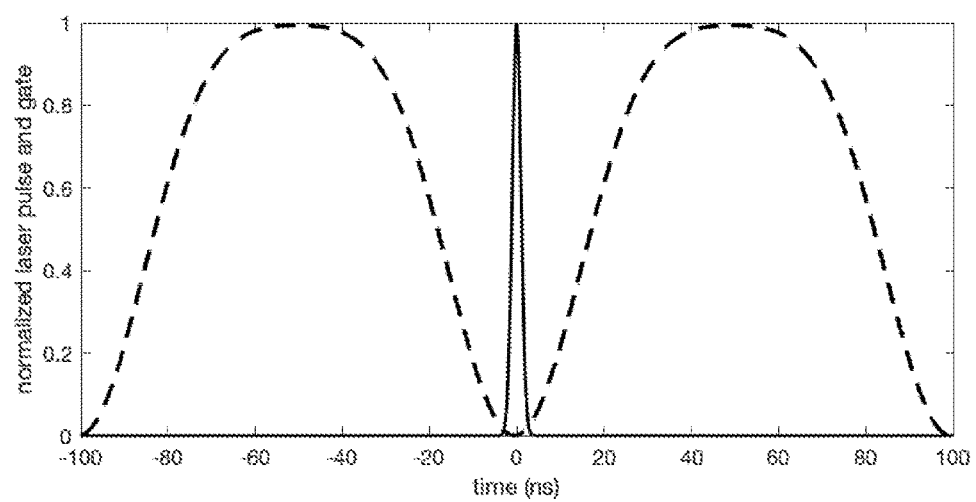
FIGS. 9B-D show examples of sampling a modulator waveform at several points, e.g. to perform normalization.
Figure 9C:
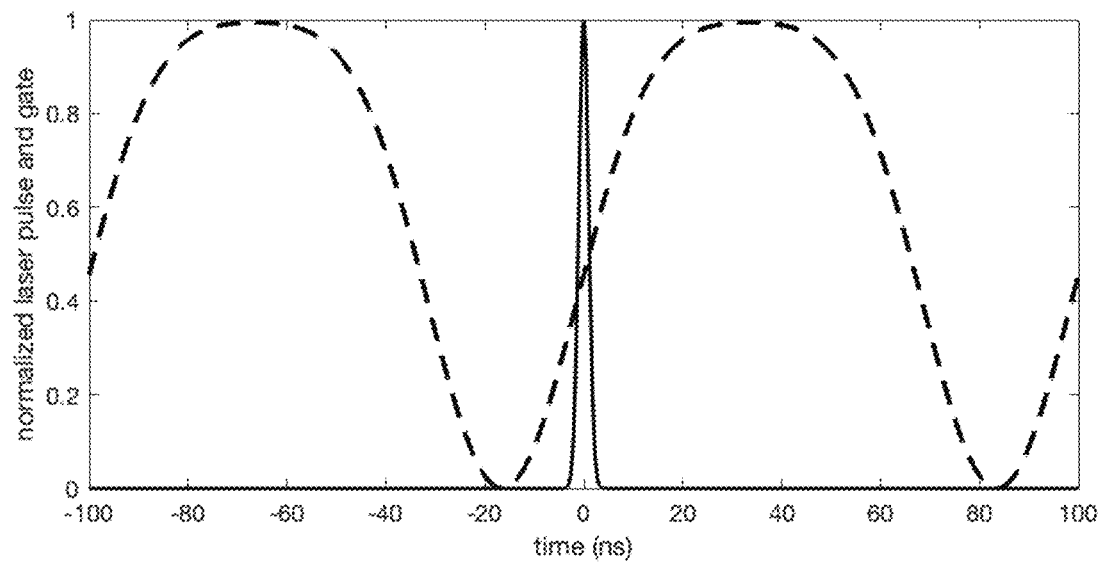
Figure 9D:
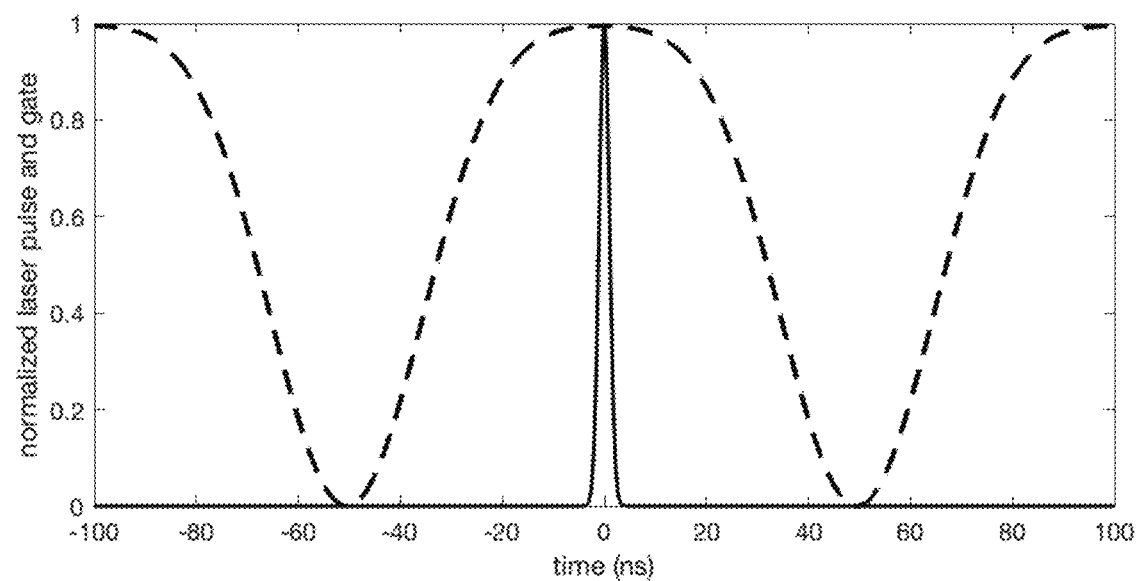

FIGS. 9B-D show examples of how frames (solid line - indicates a returning pulse at a certain point on the modulation waveform) can be aligned to the modulation waveform (dashed line) with various offsets. Frames at multiple points on the modulation waveform may be synthesized to calculate a LIDAR image, particularly when crossed or parallel polarizers are used (in which case there is no direct access to simultaneous G and U channels as with a beam splitter). Frames may be similarly synthesized with and without RF drive applied to the PC (for example in pulsed RF schemes that reduce duty cycle). Depending on the configuration, different phase or delay frames may provide measurements of background/leakage light, measurements of modulation depth, and measurements of total intensity (G+U) returning from a scene. Measurement at multiple points means changing the relative phase between the illumination and gating waveform (with each point acquired by one or more camera exposures). Relative phase may be rapidly changed between camera exposures to maximize and/or equalize sensitivity over the entire LIDAR depth of field. A single phase or delay value may have extrema and singularities in sensitivity (shown in FIG. 9A) depending on the desired depth-of-field (DOF).

Thus a normalized light detection and ranging (LIDAR) image can be obtained by
1) obtaining two or more images of the scene at a corresponding two or more points of a modulation waveform provided to the first optical intensity modulator;
2) selecting one of the points to be a reference point having a corresponding reference image; and
3) normalizing images other than the reference image using the reference image to provide one or more normalized images.

For example, an image corresponding to the frame of FIG. 9D could be used as the reference image for normalizing the images corresponding to FIGS. 9B and 9C. More generally, any of FIGS. 9B-D in this example could be taken to be the reference.

Another normalization possibility not shown is for the first and/or second polarizer element to have electrically or mechanically switchable orientation. This could allow switching between crossed and parallel polarizers in the assembly, permitting acquisition of G and U in separate image exposures for normalization.

Figure 10:
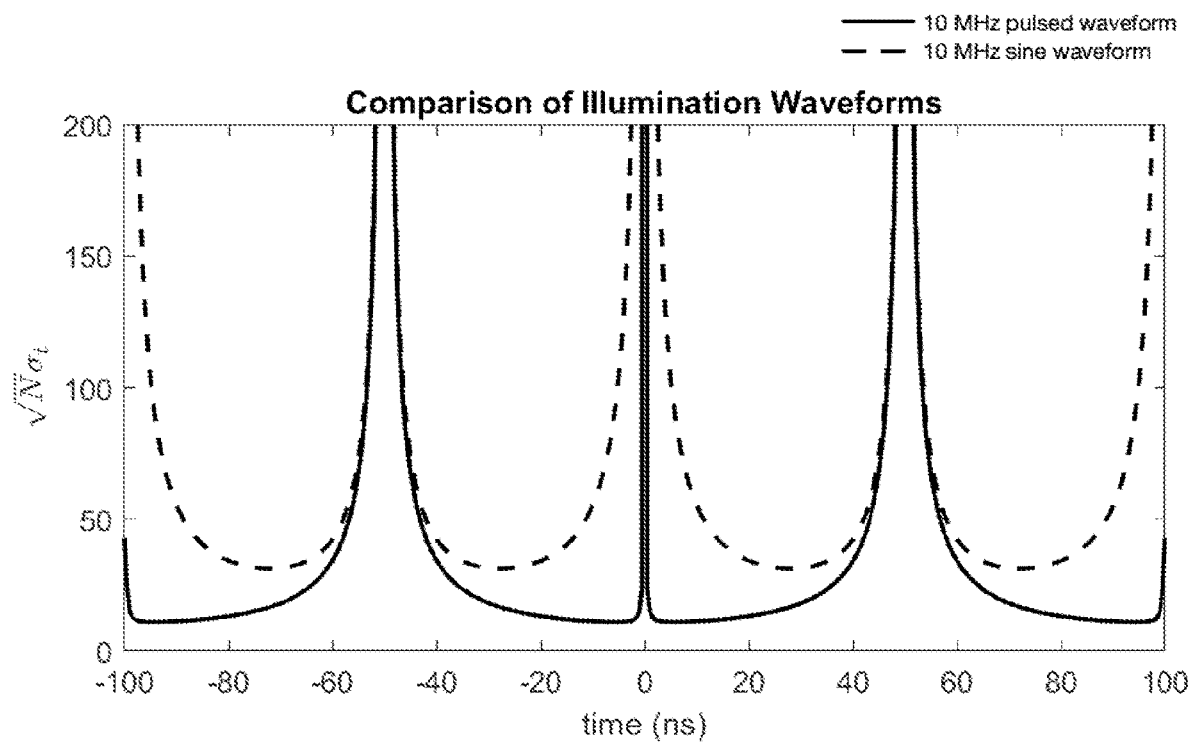
FIG. 10 shows a comparison of LIDAR accuracy for pulsed vs. sinusoid illumination, according to embodiments of the invention.

FIG. 10 shows accuracy for sine vs. pulsed illumination (σ=1 ns) at 10 MHz. We see that both may be effectively used.

FIG. 11 shows the effect of illumination pulse width on accuracy. These techniques are not sensitive to pulse width. This is a significant advantage compared to conventional photon-counting LIDAR detectors, where illumination pulse width is typically a critical parameter. Illumination pulses may even be comparable to the gating waveform width.

Figure 12A:
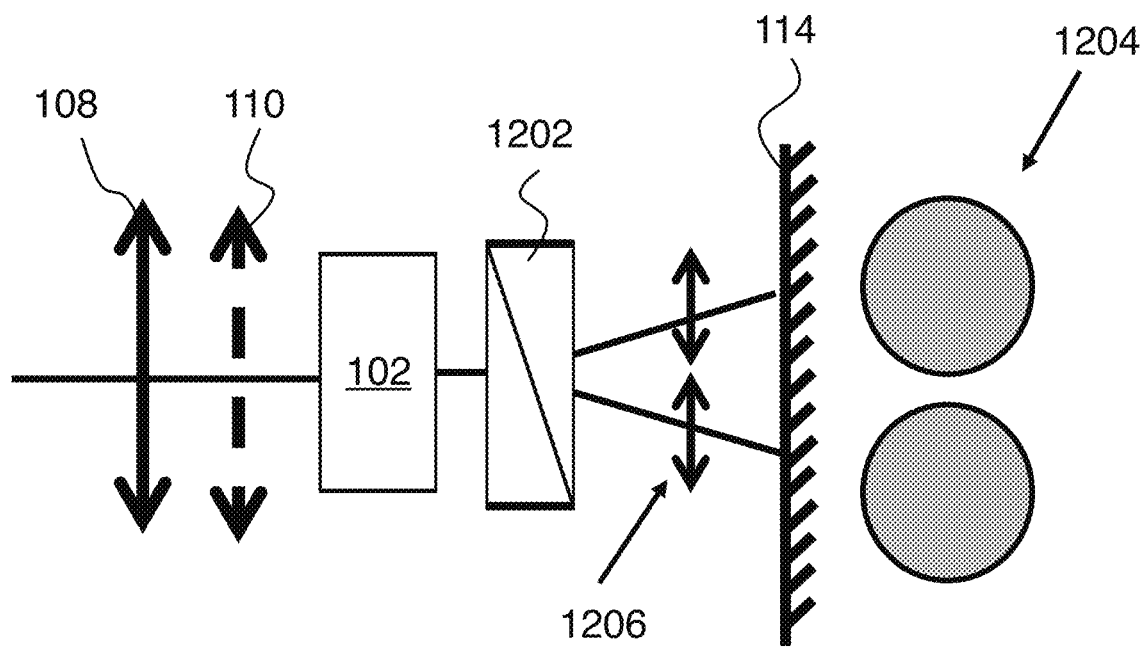
FIGS. 12A-B show further exemplary embodiments of the invention.
Figure 12B:
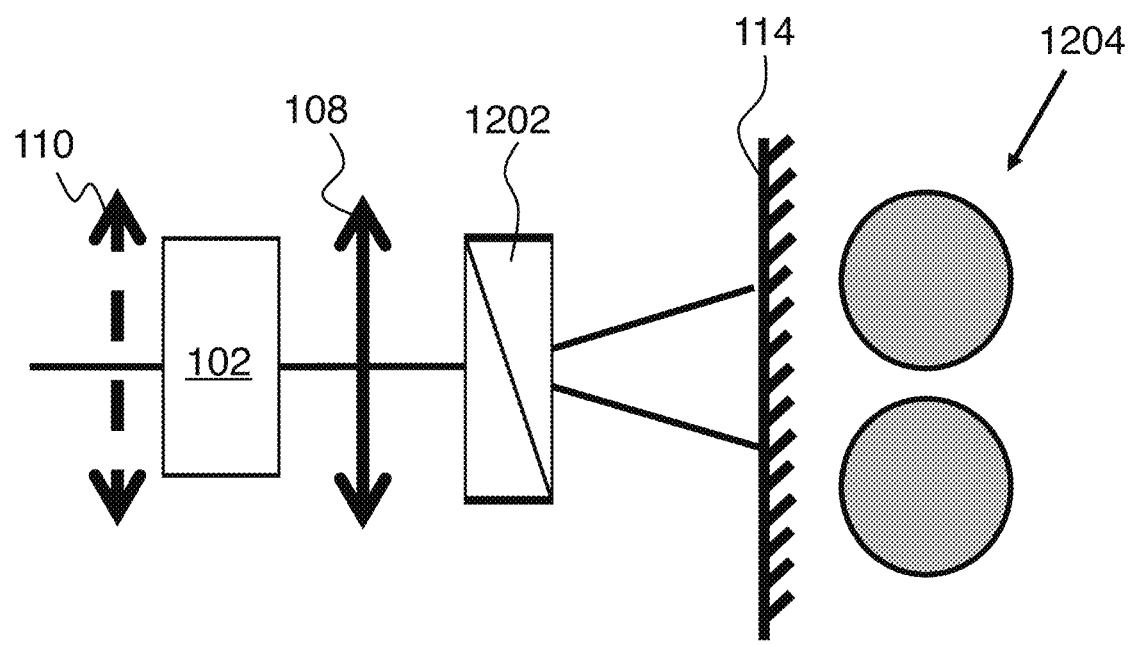

The example of FIG. 12A is similar to the example of FIG. 1A, except that a polarizing beam splitter 1202 is used instead of polarizer 112. The result is two outputs, spatially separated at detector array 114 as shown by 1204. Optional additional imaging elements 1206 may be included if/as needed. These two outputs are complementary and correspond to gated and ungated (U and G) signals as described above. The example of FIG. 12B is similar to that of FIG. 12A, except that on FIG. 12B image formation element 108 is disposed after element 102. The configuration of FIG. 12B may be suitable in cases where this configuration is receiving an image from an earlier optics stage.

FIG. 13 shows the result of adding a second modulator 1302 and second beam splitter 1304 to the configuration of FIG. 12A (with the minor further difference of a switch in order of elements 108 and 110). The result is four outputs, spatially separated at detector array 114 as shown by 1308. Optional additional imaging elements 1306 may be included if/as needed. Four image copies of the scene (labelled 1-4) provide static intensity values that encode (pairwise) the modulations of modulator 102 and modulator 1302. For example, modulator 102 may provide the vertical splitting between (1,2—Gated) and (3,4—Ungated), while modulator 1302 splits (1,3—Gated) from (2,4—Ungated). Thus two intensity ratios are available for estimation of temporal image parameters and all light admitted to the assembly is detected on the camera. This concept may be generalized to N series modulators, encoding N separate modulations in 2^N output images.

Thus the integrated assembly can further include:
1) a first beam splitter (e.g., 1202) disposed to receive light from the first planar electro-optic element and provide two first spatially separated outputs distinguished by polarization;
2) a second optical intensity modulator including at least one second planar electro-optic element (e.g., 1302) configured to modulate a state of polarization of light passing through the second planar electro-optic element; where the first spatially separated outputs are received by the second optical intensity modulator;
3) a second beam splitter (e.g., 1304) disposed to receive light from the second planar electro-optic element and provide four second spatially separated outputs distinguished by polarization and modulation; where the second spatially separated outputs are received by the planar imaging detector array.

The planar detector array may be composed of multiple camera sensors. Beamsplitters may preferably be in-line elements, e.g. birefringent prisms. Standard polarizing beamsplitters (90 degree) may also be used, for example by using a right-angle mirror to combine the perpendicular imaging paths. Mirrors may be added to facilitate beam alignment on the sensor array.

Figure 14:
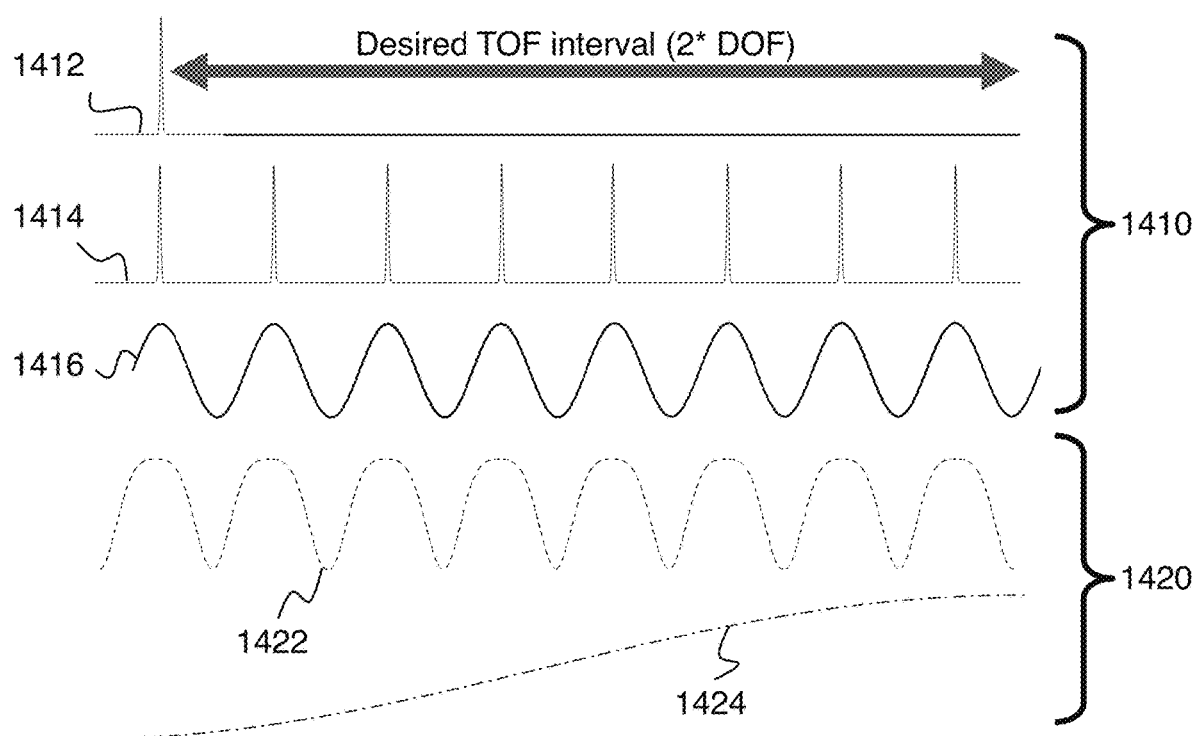
FIG. 14 shows waveforms to explain the operation of the embodiment of FIG. 13.

FIG. 14 shows several exemplary illumination waveforms 1410 and modulator gating waveforms 1420. Here illumination waveforms 1412, 1414, 1416 are isolated pulse, pulse train and sinusoid, respectively. Modulator gating waveforms 1422 are fast and resonant 1422 and slow 1424.

Conventional flash lidar involves emitting an isolated pulse 1412 into the scene, collecting light over some desired time interval corresponding to the depth-of-field, and applying a modulation over that same interval. This modulation is typically monotonic over the entire interval (as in 1424). This approach sacrifices distance measurement accuracy (from slope of 1424) when increasing DOF in a single image. Further, illumination waveforms like 1414 and 1416 are not used since they would result in multiple pulses in the DOF and on the slope of 1424 at a given time.

The dual modulator as in FIG. 13 provides a new method where the image is modulated by both a fast modulation 1422 that provides high resolution, and a slow modulation 1424 that disambiguates the phase wrapping of the multiple regions of high sensitivity on modulation waveform 1422. The estimation accuracy on waveform 1424 only needs to be enough to disentangle the phase ambiguities of gating waveform 1422, thus it can have a significantly longer slope and dramatically improve the dynamic range of a lidar measurement (Depth of Field/achievable resolution). Pulse train illumination waveforms 1414 or other amplitude modulated waveforms having a phase relation to the gate may be used (e.g. 1416).

Various illumination waveforms are compatible with our resonant apparatus. These include conventional isolated pulse waveforms and also pulse train and sine waveforms having a defined phase relative to the modulation (FIG. 14). In some cases, an asymmetric pulse shape may be used or the illumination may contain multiple frequency components. It is notable that accuracy is not very sensitive to the pulse width, and thus lower-cost and/or higher power lasers having increased pulse width may be used. The pulse width may in some cases be comparable to the modulation period. Similarly high frequency resonant operation is compatible with mode-locked laser sources that may achieve very high optical powers.

Illumination may be spatially patterned in the scene as dictated by the application. For example, an array of beamlets may be used to illuminate the scene and still be processed for LIDAR using the described methods.

It is possible for the waveform returning from a scene to become more complex in shape due to multi-path interference of the illuminating light. This might lead to multiple pulse arrival times or multiple phase components from certain pixels or image regions. This multi-path problem may still be addressed using the techniques here (in addition to computational processing)—including multi-phase measurement, multi-frequency measurements, and/or using series modulators. The shape of the illumination waveform may also be changed.

In general, the illumination waveform and modulation waveform do not strictly have to be driven at harmonics having defined phase. Incommensurate drives such as this may lead to a low frequency heterodyne beating of image intensity that can be detected by the camera's frame-rate for example. Similarly, illumination and/or detection with multiple frequency components may be used.

Figure 15:
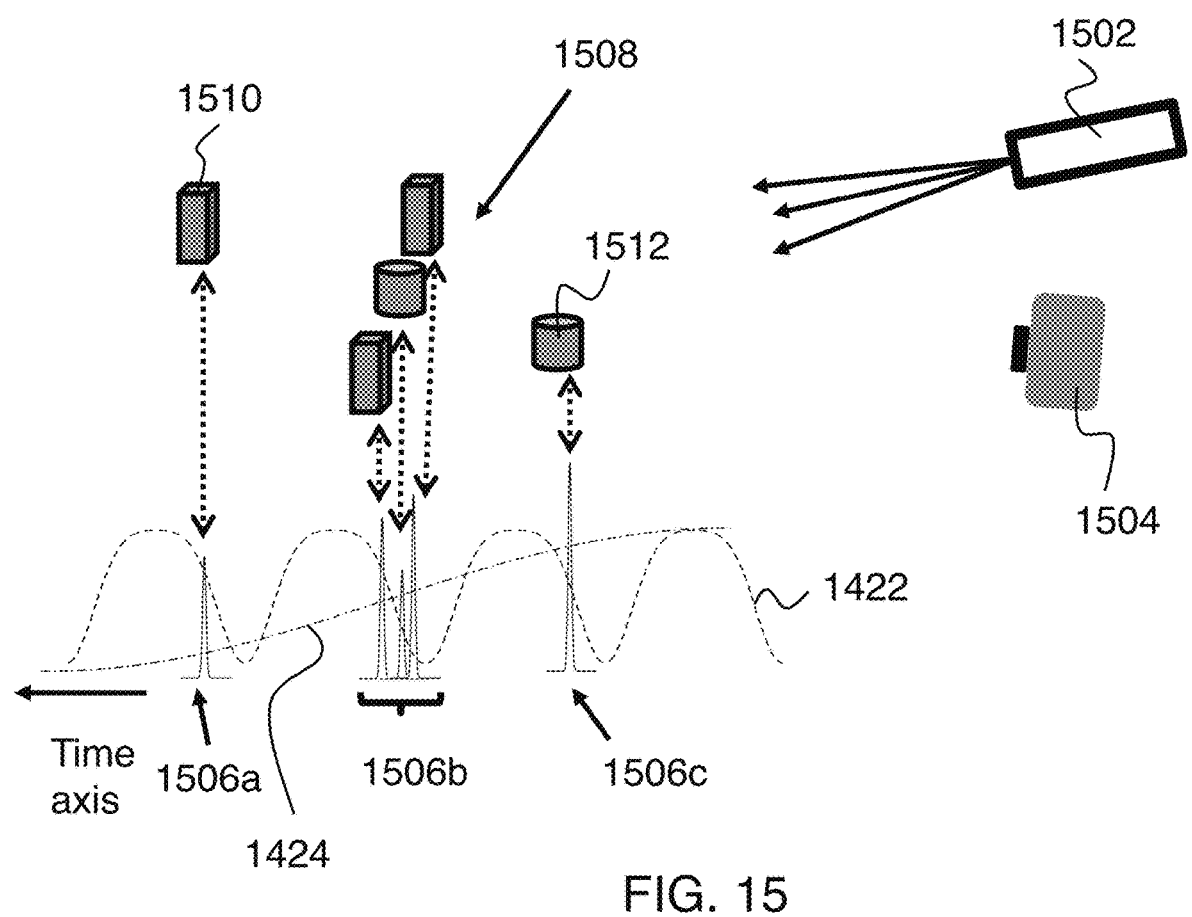
FIG. 15 shows operation of the embodiment of FIG. 13.

FIG. 15 shows an example of how this approach works. Here light source 1502 illuminates a scene including objects 1510, 1512 and object cluster 1508. LIDAR images are received by time resolved camera 1504 which can be as described above in connection with FIG. 13.

Return pulses 1506b with similar TOF may be distinguished from each other with high accuracy by the steep gating function of fast modulation 1422. Return pulses from objects occurring on separate cycles (or ambiguous phase points within one cycle—not shown) of modulation 1422 would be ambiguous using only a single modulation 1422. For example, return pulses 1506*a*, 1506*c* and the leftmost pulse on 1506*b* are ambiguous with respect to waveform 1422. They may be differentiated in distance here by their distinct gating values in modulation 1424.

Thus the configuration of FIG. 13 can be can be used to obtain a light detection and ranging (LIDAR) image from modulated illumination of the scene being viewed, where the scene being viewed has a depth of field DOF, where c is the speed of light, and where a period of the modulated illumination is less than 2*DOF/c. In this case, it is preferred that the first and second optical intensity modulators be driven with waveforms having different periods, to provide improved LIDAR resolution over the DOF without phase wrapping ambiguity.

The invention claimed is:

1. An integrated time-resolved optical imaging device comprising:
   an image formation element;
   an integrated assembly comprising:
   a) a planar imaging detector array, wherein the image formation element is disposed to provide an image of a scene being viewed to the planar imaging detector array; and
   b) a first optical intensity modulator including at least one first planar electro-optic (EO) element configured to modulate a state of polarization of light passing through the planar electro-optic element;
   wherein the first optical intensity modulator is configured to modulate the image at the planar imaging detector array;
   wherein a temporal bandwidth of the first optical intensity modulator is greater than a temporal pixel bandwidth of the planar imaging detector array;
   wherein the integrated assembly includes drive electronics configured to deliver a voltage waveform having voltage peaks of 200 V or more to the first planar electro-optic element;
   wherein the drive electronics includes a passive electrical resonator, and wherein the drive electronics is configured to excite one or more resonant frequencies of the passive electrical resonator.

2. The integrated time-resolved optical imaging device of claim 1, wherein the first optical intensity modulator includes the first planar electro-optic element sandwiched between polarizers.

3. The integrated time-resolved optical imaging device of claim 1, wherein an optical bandwidth of the integrated optical imaging device is 50 nm or more.

4. The integrated time-resolved optical imaging device of claim 1, wherein light propagates through a thickness of the first planar electro-optic element, and wherein a ratio of an aperture width to the thickness of the planar electro-optic element is 3 or more.

5. The integrated time-resolved optical imaging device of claim 1, wherein the first planar electro-optic element is configured as a longitudinal element having an applied electric field parallel to a light propagation direction through the first planar electro-optic element.

6. The integrated time-resolved optical imaging device of claim 1, wherein the first planar electro-optic element is configured as a transverse element having an applied electric field perpendicular to a light propagation direction through the first planar electro-optic element.

7. The integrated time-resolved optical imaging device of claim 1, wherein the first planar electro-optic element is integrated with the passive electrical resonator on a single circuit board.

8. The integrated time-resolved optical imaging device of claim 1, wherein the first optical intensity modulator is potted with an optical epoxy to prevent electrical breakdown.

9. The integrated time-resolved optical imaging device of claim 1, wherein the first optical intensity modulator includes one or more additional planar birefringent optical elements.

10. The integrated time-resolved optical imaging device of claim 9, wherein at least one of the additional planar birefringent optical elements is a second planar electro-optic element driven by the drive electronics.

11. The integrated time-resolved optical imaging device of claim 1, wherein the integrated assembly is configured as a multilayer stack.

12. The integrated time-resolved optical imaging device of claim 1, wherein a capacitance of the first planar electro-optic element is included in the passive electrical resonator.

13. The integrated time-resolved optical imaging device of claim 1, wherein the integrated assembly further includes:
   a first beam splitter disposed to receive light from the first planar electro-optic element and provide two first spatially separated outputs distinguished by polarization,
   a second optical intensity modulator including at least one second planar electro-optic element configured to modulate a state of polarization of light passing through the second planar electro-optic element;
   wherein the first spatially separated outputs are received by the second optical intensity modulator
   a second beam splitter disposed to receive light from the second planar electro-optic element and provide four second spatially separated outputs distinguished by polarization and modulation;
   wherein the second spatially separated outputs are received by the planar imaging detector array.

14. The integrated time-resolved optical imaging device of claim 13, wherein a light detection and ranging (LIDAR) image is obtained by modulated illumination of the scene being viewed, wherein the scene being viewed has a depth of field DOF, wherein c is the speed of light, and wherein a period of the modulated illumination is less than 2*DOF/c.

15. The integrated time-resolved optical imaging device of claim 14, wherein the first and second optical intensity modulators are driven with waveforms having different periods, whereby improved LIDAR resolution over the DOF is provided without phase wrapping ambiguity.

16. The integrated time-resolved optical imaging device of claim 1, wherein a normalized light detection and ranging (LIDAR) image is obtained by
   obtaining two or more images of the scene at a corresponding two or more points of a modulation waveform provided to the first optical intensity modulator;
   selecting one of the points to be a reference point having a corresponding reference image;
   normalizing images other than the reference image using the reference image to provide one or more normalized images.

17. The integrated time-resolved optical imaging device of claim 1, wherein a light detection and ranging (LIDAR) image is obtained by modulated illumination of the scene being viewed, wherein the scene being viewed has a depth of field DOF, wherein c is the speed of light, and wherein a period of the modulated illumination is greater than 2*DOF/c.

18. The integrated time-resolved optical imaging device of claim 1, wherein a light detection and ranging (LIDAR) image is obtained by modulated illumination of the scene being viewed, wherein the scene being viewed has a depth of field DOF, wherein c is the speed of light, and wherein a period of the modulated illumination is less than 2*DOF/c.

* * * * *